(12) United States Patent
McConaghy et al.

(10) Patent No.: US 8,074,189 B2
(45) Date of Patent: Dec. 6, 2011

(54) PRUNING-BASED VARIATION-AWARE DESIGN

(75) Inventors: Trent Lorne McConaghy, Beatty (CA); Jeffrey Dyck, Saskatoon (CA); Samer Sallam, Saskatoon (CA); Kristopher Breen, Saskatoon (CA); Joel Cooper, Saskatoon (CA); Jiandong Ge, Saskatoon (CA)

(73) Assignee: Solido Design Automation Inc., Saskatoon, Saskatchewan (CA)

( * ) Notice: Subject to any disclaimer, the term of this patent is extended or adjusted under 35 U.S.C. 154(b) by 490 days.

(21) Appl. No.: 12/366,239

(22) Filed: Feb. 5, 2009

(65) Prior Publication Data

US 2009/0216359 A1    Aug. 27, 2009

Related U.S. Application Data

(60) Provisional application No. 61/026,255, filed on Feb. 5, 2008.

(51) Int. Cl.
*G06F 17/50* (2006.01)

(52) U.S. Cl. ........ 716/100; 716/106; 716/110; 700/103; 703/1; 703/14

(58) Field of Classification Search .................. 716/100, 716/106, 110, 139; 700/103; 703/14, 1; 706/47
See application file for complete search history.

(56) References Cited

U.S. PATENT DOCUMENTS

| | | | |
|---|---|---|---|
| 7,707,533 B2 * | 4/2010 | McConaghy et al. | 716/119 |
| 2008/0022232 A1 * | 1/2008 | McConaghy et al. | 716/1 |
| 2008/0300847 A1 * | 12/2008 | McConaghy et al. | 703/14 |
| 2009/0083680 A1 * | 3/2009 | McConaghy et al. | 716/3 |

* cited by examiner

*Primary Examiner* — Sun Lin
(74) *Attorney, Agent, or Firm* — Louis B. Allard; Borden Ladner Gervais LLP

(57) ABSTRACT

For application to analog, mixed-signal, and custom digital circuits, a system and method to begin with a complex problem description that encompasses many variables from statistical manufacturing, the circuit's environment, and the circuit's design parameters, but then apply techniques to prune the scope of the problem to make it manageable for manual design and more efficient automated design, and finally use that pruned problem for more efficient and effective design.

54 Claims, 11 Drawing Sheets

PRUNING-BASED VARIATION-AWARE DESIGN

CROSS REFERENCE TO RELATED APPLICATIONS

This application claims the benefit of priority of U.S. Provisional Patent Application No. 61/026,255 filed Feb. 5, 2008, which is incorporated herein by reference in its entirety.

The applicant acknowledges the participation of K. U. Leuven Research and Development in the development of this invention.

FIELD OF THE INVENTION

The present invention relates generally to analog, mixed-signal, and custom digital electrical circuit designs (ECDs). More particularly, the present invention relates to design tools used to improve the performance of such circuits.

BACKGROUND OF THE INVENTION

Software tools are frequently used in the design of analog, mixed-signal and custom digital circuits. In front-end design-for-yield, designers must choose device sizes such that the maximum possible percentage of manufactured chips meet all specifications such as, e.g., gain >60B and a power consumption <1 mW. As such, the designers strive to maximize the yield of electrical circuit designs.

The design-for-yield problem of an ECD can easily include thousands of variables because there may be any number of devices in the ECD, each device having features of adjustable sizes, and being subject to any number of process variables, which are random in nature. The space of possible designs is very high as well, because there may by any number of design variables (variable dimensions or sizes) per device. Environmental variables such as, e.g., temperature and load conditions must be considered as well. Many these effects can be simulated simultaneously in any suitable electronic circuit simulator such as, e.g., a Simulation Program with Integrated Circuit Emphasis (SPICE) software. However, the design problem is hard to decompose into simpler problems because the variables often have nonlinear interactions. All these variables impede a designer's ability to understand the issues affecting yield early in the design stage, and therefore his ability to choose device sizes that maximize yield.

One approach to handle the large number of interacting variables is to use an automated circuit-sizing tool. Unfortunately, the tool may not be able to simultaneously scale to a large number of process variables, environmental variables, and design variables, be accurate, and have reasonable runtime. Even if such automated sizing tools can handle those issues, the designers will often choose to not use them because, in the past, many sizers have been unreliable. Further, automated sizing tools tend to take away the designer's sense of control in the design. As will be appreciated, designers need to have a sense of control and trust in the design that they create because they, not the automated sizer, are ultimately responsible for the design's success upon fabrication. Manual iterations remain by far the most common approach to circuit sizing, and it will likely remain like this for years to come.

To overcome problems with respect a high number of variables, designers often try to prune down, or simplify, their design problem with respect to process variables and environmental variables. For example, instead of explicitly acknowledging possibly thousands of random process variables and environmental variables, effects are captured as global process corners. An example of such global process corners can be drawn from CMOS device models having their process variables set to model an NMOS component having possible fast or slow behaviors, and a PMOS component also having possible fast or slow behaviors. The CMOS device can then be analyzed at Fast(NMOS)/Fast(PMOS), Fast(NMOS)/Slow(NMOS), Slow(PMOS)/Fast(NMOS), and Slow(PMOS)/Slow(NMOS) global process corners. Another reason for using global process corners is that they are usually readily available from the chip foundry (fab), because such corners have traditionally nicely bracketed, for digital circuits, the key digital performance characteristics of speed and power.

Designers also typically handle environmental variables with corners. For example, in the case where temperature (T) and resistance (R) are environmental variables, global corners can be defined as (Low_T, Low_R), (Low_T, High_R), (High_T, Low_R) and (High_T, High_R). Accordingly, an overall corner has both settings for environmental and process variables. Therefore, instead of having to consider thousands of random and environmental variables during design, designers have reduced the design problem to that of sizing the circuit such that it meets the specifications at the pre-determined corners. Note that by using corners on process variables, they are also implying that they target 100% yield (or near-100% yield) rather than the best yield possible. This is acceptable since most practical industrial designs do expect near-100% yields for each sub-circuit of the design in order to proceed to fabrication.

Another practice that designers have is to get the ECD first working at a typical global process corner and at a typical environmental corner, and then, upon the ECD meeting the specifications at that corner, to add more corners. This has been a reasonable approach because the device sizes tend to have the biggest impact on circuit performance, followed by random and environmental effects. Automated circuit sizers can also have their problems simplified to global process corners combined with environmental corners, and indeed this is what has been done in practice for years.

An example of the above-noted circuit sizing method, which can also be referred to as a circuit sizing flow, or, simply a flow, can be written as:
1. corner=typical global process corner & typical environmental corner
2. change device sizes to meet specifications at corner, using SPICE for feedback (manual or automatic)
3. corners=cross-product of global process corners and a representative coverage of environmental space
4. change device sizes to meet specifications at corners, using SPICE for feedback (manual or automatic)
5. optionally manually choose more corners and add to corners, and go to step 4.

As noted, steps 2 and 5 can be manual or automatic, depending on designer preference.

The main problem with global process corners, and therefore the flow described above, is that global corners do not include device-level process variations, which can also be referred to as local variations. To have a better measure of yield, designers can run a Monte-Carlo analysis, which draws random points from a probability distribution that describes both local & global process variation. For each random point, representing a local and global process variation, one or many environmental corners are simulated for one or more circuit analyses (e.g., AC, DC, or transient electrical behaviors). From the simulation results, performance values can be derived for each process and environmental point, and, from those values, one can compute the feasibility of each random point, and finally the yield. FIG. 1 shows a scatter plot of actual simulation data (circles) from a gain-boosted operational amplifier designed using a 90 nm CMOS process. The parameters plotted are phase margin as a function of spurious-free dynamic range. FIG. 1 shows how global process corners (diamonds) are a poor approximation of variation effects, compared to Monte Carlo samples. The discrepancy is primarily due to local variation effects, which are not accounted for in global process corners. Although Monte Carlo analysis does account for local variations, it requires a long time to complete (typically hours to days). For this reason, it is impractical to use such analyses repeatedly within a manual or automatic sizing loop. Accordingly, it is typically performed late in the front-end design process, as a verification step.

It is clear from FIG. 1 that the global corners do not account for, or give a good representation of, how much the length of a given transistor may vary, or other parameters that affect its electrical behavior such as, e.g., oxide thickness, or substrate doping concentration. For modern circuit geometries having small features sizes (e.g., 90 nm), the local process variations will often dominate the global variation effects. One particularly important case is where devices requiring matched geometries to function correctly vary independently (often referred to as device mismatch). This can cause significant loss in yield because mismatch can be a limiting factor in circuit performance (this is almost always the case in analog circuits). Therefore, meeting specifications at just global process corners can mean little to the overall yield of the design.

Given that sizing an ECD using just global process corners is inaccurate, and Monte Carlo in the sizing loop is too slow, there exists an approach that partially reconciles the issues. To our knowledge, it is not a common design practice yet, and is not published explicitly, but it nonetheless is implicit in existing industrial ECD design tools, and is used by leading-edge designers. At its core, this approach uses Monte Carlo sampling combined with a naïve process-corner discovery approach. This flow (method) for front-end design using local and global process corners can be described as follows.

1. corners=initial corner composed of {nominal global process point and typical environmental point}
2. change device sizes to meet specifications at corners, using SPICE for feedback
3. do Monte Carlo sampling on new design
4. if stopping conditions are met (e.g., target yield is hit), stop
5. do naïve process-corner discovery: from Monte Carlo sample data, for each performance metric, add the process and environmental corner that causes the metric's worst-case performance to corners
6. go to step 2

There can be varying degrees of automation in this flow. For example, everything but the actual Monte Carlo sampling can be fully manual. Alternatively, the whole flow can be fully automatic. Other options, such as step 2 being semi-automatic (semi-manual), and step 5 being automatic, are also possible.

This flow (method) is an improvement on the past methods, because it handles both local and global variations, yet does not have the slowness of Monte Carlo sampling as part of the sizing loop itself (step 2). It has pruned the problem difficulty down by treating the process variables space and the environmental variables space as corners rather than having to reconcile the massive number of variables directly. The problem difficulty has also been reduced by simplifying the overall goal from "get best yield" (<100%) to "go for 100% yield". In this problem, pruning has not compromised accuracy, unlike the simplification that just uses global process corners. The flow also supports manual, automation-aided, and fully automated flows depending on user preference. Unfortunately, this method has issues. First, the design space can remain very large, possibly having hundreds of design variables (large for transistor-level design). Such a large design space means that the device-sizing step (2) can be intractable, inefficient, or lead to a sub-optimal design (i.e., unsolved at given corners). Furthermore, the naïve process-corner discovery step is too simplistic, which causes great inefficiency. For example, in a typical analog circuit having 15 performance metrics, there would be 15 new corners added in each re-loop from step 6 to step 2. Accordingly, after just a couple re-loops, the sizing step (2) starts to get as slow as Monte Carlo sampling which as already been established as being too slow.

Therefore, designers have no efficient method for sizing a broad range of ECDs that is variation-aware, because even the state-of-the-art approach does not scale to ECDs of medium to large size, ECDs that have a larger number of design variables and/or performance metrics.

Further, many existing computer-aided design (CAD) tools are designed to handle problems that are specified in terms of corners only, not problems that include probability density function as part of the problem input (e.g., as a model of process variation). Typically, the corners for these CAD tools only include global process variables (input as global process corners), sometimes environmental variables, rarely local process variables, and very rarely all three. Yet as local variations becomes more of an issue with shrinking process geometries, it is becoming important for these CAD tools to account for these variations. Many of the existing CAD tools, such as, for examples, digital timing analysis tools, are deeply entrenched and established, with a lot of capital investment and designer training tied to them. Accounting for local process variation effects directly as a probability distribution (e.g., statistical timing analysis) can mean that the whole CAD tool set, and its related design flow needs to change. This is unpalatable because it is costly and requires training as well. A better intermediate approach would be to account for the local process variations (and environmental variables, if needed) in corners, which can be input into the existing tools, thereby keeping the existing CAD tool infrastructure and design flows and engineers' training investment. Then, the challenge is to have an efficient, effective means to find representative corners for the design that do indeed include all the variations.

Therefore, there is a need for ECD flows that provide improved efficiency in circuit sizing. There is also a need for a flow that makes use of existing CAD tools and that accounts for local process variations.

SUMMARY OF THE INVENTION

In a first aspect of the invention, there is provided a method to size an electrical circuit design (ECD), the ECD having process variables and environmental variables associated thereto, the process variables defining a process variables space, the environmental variables defining an environmental variables space, the ECD having devices, the devices having associated thereto variable dimensions, the variables dimensions having associated thereto a first set of sizes, the ECD further having associated thereto a plurality of performance metrics, the method comprising steps of: sampling at least one of the process variables space and the environmental variables space to obtain a first set of sample points; automatically simulating the ECD, in accordance with the first set of sizes, at the first set of sample points to obtain first simulation data; calculating a value for each performance metric in accordance with the first simulation data to obtain a first set of performance data; determining if a portion of the first set of performance data is outside pre-determined boundaries; if a portion the first set of performance data is outside the pre-determined boundaries, selecting, from the first set of samples points, in accordance with the first set of performance data and in accordance with pre-determined rules, samples points to obtain a set of selected sample points; varying at least one size of the first set of sizes to obtain a second set of sizes; simulating the ECD, in accordance with the second set of sizes, at the set of selected sample points to obtain second simulation data; calculating a value for each performance metric in accordance with the second simulation data to obtain a second set of performance data; determining if the second set of performance data is inside the pre-determined boundaries; and if the second set of performance data is inside the pre-determined boundaries, storing the second set sizes in a computer-readable medium.

The pre-determined rules can include selecting, for each performance metric, a sample point having a maximum performance value and a sample point having a minimum performance value. Further, the pre-determined rules can include selecting one or more sample points through inverse non-dominated filtering of the first set of sample points. The inverse non-dominated filtering of the first set of sample points can be followed by a clustering of the sample points, the clustering being in accordance with a pre-determined performance scaling criteria.

The pre-determined rules can include selecting, for each performance metric, a sample point having a worst-case performance value, the worst-case performance value being one of: (a) a maximum performance value for a performance metric to be minimized in the ECD; (b) a maximum performance value for a performance metric that is to be set equal or greater than a pre-determined threshold in the ECD; (c) a minimum performance value for a performance metric to be maximized in the ECD; and (d) a minimum performance value for a performance metric that is to be set equal or smaller than a pre-determined threshold in the ECD. The step of selecting can be followed by a clustering of the sample points in accordance with at least one of a pre-determined process variables space scaling criteria and a pre-determined environmental variables space scaling criteria.

The minimum performance value can be outside a pre-determined feasibility range. The step of selecting can be followed by a clustering of the sample points in accordance with at least one of a pre-determined process variables space scaling criteria and a pre-determined environmental variables space scaling criteria.

The step of automatically simulating the ECD can include simulating the ECD at the first set of sample points, with a plurality of test harnesses, the first simulation data including simulation data for each test harness, the performance data including performance data for each test harness; and the pre-determined rules can include calculating, for each test harness, in accordance with its respective performance data, a yield of the ECD for each sample point; and selecting a sample point associated with a lowest yield of the ECD.

The step of automatically simulating the ECD can include simulating the ECD at the first set of sample points, with a plurality of test harnesses, the first simulation data including simulation data for each test harness, the performance data including performance data for each test harness; and the pre-determined rules can include calculating, for each test harness, in accordance with its respective performance data, a yield of the ECD for each sample point; and selecting, for each test harness, a sample point associated with a lowest yield of the ECD.

The step of selecting, for each performance metric, the sample point having a maximum performance value and the sample point having a minimum performance value, can include modeling each performance metric as a function of the at least one of the process variables space and the environmental variables space, to obtain a model of each performance metric; and optimizing the model of each performance metric to obtain the sample point having a maximum performance value and the sample point having a minimum performance value.

The step of selecting, for each performance metric, the sample point having a worst-case performance value, can include modeling each performance metric as a function of the at least one of the process variables space and the environmental variables space, to obtain a model of each performance metric; and optimizing the model of each performance metric to obtain the sample point having the worst-case performance value.

The step of selecting, for each performance metric, the sample point having a worst-case performance value, can include modeling each performance metric as a function of the at least one of the process variables space and the environmental variables space, to obtain a model of each performance metric; for each performance metric to be maximized in the ECD, optimizing the model of each performance metric to obtain a sample point having a respective minimum performance value; and for each performance metric to be minimized in the ECD, optimizing the model of each performance metric to obtain the sample point having a respective maximum performance value.

The performance metrics can include at least one of an area of the ECD, power consumption, gain and bandwidth. The sep simulating the ECD can include simulating the ECD in accordance with an analog electronic circuit simulator. The step of sampling can include Monte Carlo sampling from a distribution describing manufacturing variations of the process variables. The step of sampling can include Latin Hypercube sampling from a distribution describing manufacturing variations of the process variables.

In a second aspect of the present invention, there is provided a method to size an electrical circuit design (ECD), the ECD having associated thereto design variables, process variables, and environmental variables, the design variables, process variables and environmental variables respectively defining a design variables space, a process variables space and an environmental variables space, the ECD having devices, the devices having associated thereto variable dimensions, the variable dimensions being part of the design variables, the variables dimensions having associated thereto a first set of sizes, the ECD further having associated thereto performance metrics, the method comprising steps of: sampling the process variables space to obtain a first set of sample points; automatically simulating the ECD at the first set of sample points, in accordance with the first set of sizes, to obtain first simulation data; calculating, in accordance with the first simulation data, for each of the sample points, a value of at least one of the performance metrics to obtain a first set of performance data; calculating, in accordance with the first set of performance data, an impact of each process variable on the at least one of the performance metrics; calculating, in accordance with the impact of each process variable on the at least one of the performance metrics, an impact of each device on the at least one of the performance metrics; identifying, in accordance with the impact of each device on the at least one of the performance metrics, one or more devices each having an impact on the at least one of the performance metrics that is less than a pre-determined minimum impact, to obtain a lowest impact device set; identifying design variables upon which the lowest impact device set depends, to obtain identified design variables, the identified design variables including at least one size of the first set of sizes; fixing each of the identified design variables to a constant value, to have the first set of sizes include fixed sizes and variables sizes; varying at least one variable size of the first set of sizes to obtain a second set of sizes; selecting, from the first set of sample points, in accordance with the first set of performance data, and in accordance with pre-determined rules, a second set of sample points; automatically simulating the ECD, at the second set of sample points, for the second set of sizes, to obtain second simulation data; calculating, in accordance with the second simulation data, a value of each of the performance metrics to obtain a second set of performance data; determining if the second set of performance data is outside pre-determined boundaries; if the second set of performance data is outside the pre-determined boundaries, varying at least one size of the second set of sizes to obtain a third set of sizes; automatically simulating the ECD, at the second set of sample points, for the third set of sizes, to obtain third simulation data; calculating, in accordance with the third simulation data, a value of the performance metric to obtain a third set of performance data; determining if the third set of performance data is outside the pre-determined boundaries; and if the third set of performance data is inside the pre-determined boundaries, storing the third set of sizes in a computer-readable medium.

The pre-determined rules can include selecting, for each performance metric, a sample point having a maximum performance value and a sample point having a minimum performance value. The step of calculating, in accordance with the first set of performance data, an impact of each process variable on at least one of the performance metrics, can include a step of analyzing an absolute correlation of each process variable on the at least one of the performance metrics. The step of calculating, in accordance with the first set of performance data, an impact of each process variable on at least one of the performance metrics, can include a step of applying analysis of variance technique to relate process variable values to the at least one of the performance metrics. The step of calculating, in accordance with the first set of performance data, an impact of each process variable on at least one of the performance metrics, can include steps of: determining, in accordance with the performance data and with the pre-determined boundaries, a feasibility of each sample point of the first set of sample points; forming a classifier model for the performance metrics, the classifier model mapping process variables to feasibility; and extracting, in accordance with the classifier model, a relative importance of each process variable on the feasibility.

The step of calculating, in accordance with the first set of performance data, an impact of each process variable on at least one of the performance metrics, can include steps of: determining, in accordance with the performance data and with the pre-determined boundaries, a worst-case value for each performance metric of each process point; forming a regressor model for each performance metric, the regressor models mapping the process variables to worst-case performance values; and extracting, in accordance with the regressor models, a relative importance of each process variable on each worst case performance value.

The performance metrics can include one of an area of the ECD, power consumption, gain and bandwidth. The step of simulating the ECD includes simulating the ECD in accordance with an analog electronic circuit simulator. The step of sampling can includes Monte Carlo sampling. The step of sampling can include Latin Hypercube sampling. The step of calculating, in accordance with the impact of each process variable, an impact of each device on at least one of the performance metrics can include, for each device, summing the impacts of each process variable associated with the device.

The step of calculating, in accordance with the impact of each process variable on the at least one of the performance metrics, an impact of each device on the at least one of the performance metrics can include: identifying process variables having an impact on the at least one of the performance metrics that is greater that a pre-determined threshold; and calculating the impact of each device on the at least one of the performance metric in accordance with the impacts that are greater that the pre-determined threshold.

The step of calculating, in accordance with the impact of each process variable on the at least one of the performance metrics, an impact of each device on the at least one of the performance metrics can include: ordering the process variables in accordance with their respective impact to obtain an impact order of process variables; and selecting, in accordance with the impact order of the process variables a pre-determined number of process variables; and identifying, in accordance with the impact of each device on the at least one of the performance metrics, the one or more devices that each has an impact on the at least one of the performance metrics that is greater than the pre-determined minimum impact, to obtain a highest impact device set, includes identifying the one or more devices in accordance with the selected pre-determined number of process variables.

The step of calculating, in accordance with the impact of each process variable on the at least one of the performance metrics, an impact of each device on the at least one of the performance metrics, can include steps of: calculating a total impact of all process variables as a summation of each process variable impact; ordering the process variables from a highest-impact to a lowest-impact; selecting a subset of process variables by choosing highest-impact process variables having a sum impact that is substantially equal to a pre-determined percentage of the total impact; and calculating the impact of each device on the at least one of the performance metrics, in accordance with the impact of each process variable of the subset of process variables.

The step of identifying design variables upon which the lowest impact device set depends, can include steps of: displaying at least one of the design variables and devices, and their respective impacts to a user; and the user identifying the design variables related to the highest impact device set.

The step of fixing each of the identified design variables to a constant value, to have the first set of sizes include fixed sizes and variables sizes, can include setting each identified design variable to a corresponding value of the first set of sizes.

In a third aspect of the present invention, there is provide a method to size an electrical circuit design (ECD), the ECD having associated thereto design variables, process variables, and environmental variables, the design variables, process variables and environmental variables respectively defining a design variables space, a process variables space and an environmental variables space, the ECD having associated thereto a set of design corners representing a sample of the process variables space, the ECD having devices, the devices having associated thereto variable sizes, the variable sizes being part of the design variables, the ECD further having associated thereto performance metrics, the method comprising steps of:

sampling the design variables space to obtain a first set of candidate designs; automatically simulating each candidate design at each design corner, to obtain first simulation data; calculating, in accordance with the first simulation data, for each candidate design, a value of at least one of the performance metrics to obtain a first set of performance data; calculating, in accordance with the first set of candidate designs and the first set of performance data, an impact of each design variable on the at least one of the performance metrics, to obtain impact data; identifying, in accordance with the impact data, one or more design variables, to obtain identified design variables, each identified design variable having an impact on the at least one of the performance metrics that is less than a pre-determined maximum impact; reducing the design variables space by fixing each of the identified design variables to a constant value, to obtain a reduced design variables space; assigning, for each design variable of the reduced design variables space, a first size value to obtain a first set of sizes automatically simulating the ECD, in accordance with the set of design corners, for the first set of sizes, to obtain second simulation data; calculating, in accordance with the second simulation data, a value of the at least one performance metric to obtain a second set of performance data; determining if the second set of performance data is outside pre-determined boundaries; if the second set of performance data is outside the pre-determined boundaries, varying at least one size of the first set of sizes to obtain a second set of sizes; automatically simulating the ECD, in accordance with the set of design corners, at the second set of sizes, to obtain third simulation data; calculating, in accordance with the third simulation data, a value of the at least one performance metric to obtain a third set of performance data; and determining if the third set of performance data is outside the pre-determined boundaries; and if the third set of performance data is inside the pre-determined boundaries, storing the second set sizes in a computer-readable medium.

The step of calculating, in accordance with the first set of candidate designs and with the first set of performance data, an impact of each design variable on at least one of the performance metrics, can include a step of analyzing an absolute correlation of each design variable on the at least one of the performance metrics.

The step of calculating, in accordance with the first set of candidate designs and with the first set of performance data, an impact of each design variable on at least one of the performance metrics, can include a step of applying analysis of variance technique to relate process variable values to the at least one of the performance metrics.

The step of calculating, in accordance with the first set of candidate designs and with the first set of performance data, an impact of each design variable on at least one of the performance metrics, can include steps of: determining, in accordance with the performance data and with the pre-determined boundaries, a feasibility of each sample point of the first set of sample points; forming a classifier model for the performance metrics, the classifier model mapping design variables to feasibility; and extracting, in accordance with the classifier model, a relative importance of each design variable on the feasibility.

The step of calculating, in accordance with the first set of candidate designs and with the first set of performance data, an impact of each design variable on at least one of the performance metrics, can include steps of: determining, in accordance with the performance data and with the pre-determined boundaries, a worst-case value for each performance metric of each candidate design; forming a regressor model for each performance metric, the regressor models mapping the design variables to worst-case performance values; and extracting, in accordance with the regressor models, a relative importance of each design variable on each worst case performance value.

The performance metrics can include one of an area of the ECD, power consumption, gain and bandwidth. Simulating the ECD can include simulating the ECD in accordance with an analog electronic circuit simulator. Sampling the design variables space can include Monte Carlo sampling across uniform distributions of each design variable, each uniform distribution bounded by respective maximum and minimum values of each design variables. Sampling the design variables space can include Latin Hypercube sampling across uniform distributions, each uniform distribution bounded by respective maximum and minimum values of each design variables.

The step of identifying, in accordance with the impact data, one or more design variables, can include steps of: ordering the design variables from highest-impact to lowest-impact; and keeping only a pre-determined number of lowest-impact design variables. The step of dentifying, in accordance with the impact data, one or more design variables, can includes steps of: calculating a total impact of all design variables as a summation of each variable's impact; ordering the design variables from highest-impact to lowest-impact; selecting a subset of design variables by choosing lowest-impact process variables having a sum impact that is substantially equal to a pre-determined percentage of the total impact; calculating the impact of each design variable on the at least one of the performance metrics, in accordance with the impact of each design variable of the subset of process variables; and identifying, in accordance with the impact data, one or more design variables, to obtain identified design variables, each identified design variable having an impact on the at least one of the performance metrics that is less than a pre-determined maximum impact.

The step of identifying, in accordance with the impact data, one or more design variables, to obtain identified design variables, can include steps of: displaying at least one of the design variables and its respective impact to a user; and the user identifying the design variables related to the lowest impact.

In a fourth aspect of the invention, there is provided, in a sizing procedure of electrical circuit design (ECD), the ECD having associated thereto design variables, process variables, and environmental variables, the design variables, process variables and environmental variables respectively defining a design variables space, a process variables space and an environmental variables space, the ECD having devices, the devices having associated thereto variable dimensions, the variable dimensions being part of the design variables, the variables dimensions having associated thereto a first set of sizes, the ECD further having associated thereto performance metrics, a method to reduce a number of the variables dimensions to size, the method comprising steps of: sampling the process variables space to obtain a first set of sample points; automatically simulating the ECD at the first set of sample points, in accordance with the first set of sizes, to obtain first simulation data; calculating, in accordance with the first simulation data, a value of each performance metric to obtain a first set of performance data; calculating, in accordance with the first set of performance data, an impact of each process variable on at least one of the performance metrics; calculating, in accordance with the impact of each process variable on the at least one of the performance metrics, an impact of each device on the at least one of the performance metrics; identifying, in accordance with the impact of each device on the at least one of the performance metrics, one or more devices each having an impact on the at least one of the performance metrics that is greater than a pre-determined minimum impact, to obtain a highest impact device set; identifying design variables unrelated to the highest impact device set, to obtain identified design variables, the identified design variables including at least one size of the first set of sizes; and fixing each of the identified design variables to a constant value, to have the first set of sizes include fixed sizes and variables sizes.

In a fifth aspect of the present invention, there is provided, in a sizing procedure of electrical circuit design (ECD), the ECD having associated thereto design variables, process variables, and environmental variables, the design variables, process variables and environmental variables respectively defining a design variables space, a process variables space and an environmental variables space, the ECD having associated thereto a set of design corners representing a sample of the process variables space, the ECD having devices, the devices having associated thereto variable sizes, the variable sizes being part of the design variables, the ECD further having associated thereto performance metrics, a method to reduce a number of the variables dimensions to size, the method comprising steps of the method comprising steps of: sampling the design variables space to obtain a first set of candidate designs; automatically simulating each candidate design at each design corner, to obtain first simulation data; calculating, in accordance with the first simulation data, for each candidate design, a value of at least one of the performance metrics to obtain a first set of performance data; calculating, in accordance with the first set of candidate designs and the first set of performance data, an impact of each design variable on the at least one of the performance metrics, to obtain impact data; identifying, in accordance with the impact data, one or more design variables, to obtain identified design variables, each identified design variable having an impact on the at least one of the performance metrics that is less than a pre-determined maximum impact; reducing the design variables space by fixing each of the identified design variables to a constant value, to obtain a reduced design variables space; and if the second set of performance data is inside the pre-determined boundaries, storing the second set sizes in a computer-readable medium.

In a sixth aspect of the present invention, there is provided a method to size an electrical circuit design (ECD), the ECD having process variables and environmental variables associated thereto, the process variables defining a process variables space, the environmental variables defining an environmental variables space, the ECD having devices, the devices having associated thereto variable dimensions, the variables dimensions having associated thereto a first set of sizes, the ECD further having associated thereto a plurality of performance metrics, the method comprising steps of: sampling at least one of the process variables space and the environmental variables space to obtain a first set of sample points; automatically simulating the ECD, in accordance with the first set of sizes, at the first set of sample points to obtain first simulation data; calculating a value for each performance metric in accordance with the first simulation data to obtain a first set of performance data; determining if a portion of the first set of performance data is outside pre-determined boundaries; if a portion the first set of performance data is outside the pre-determined boundaries, selecting, from the first set of samples points, in accordance with the first set of performance data and in accordance with pre-determined rules, samples points to obtain a set of selected sample points; outputting the set of selected sample points to a computer aided design (CAD) module; and at the CAD module, in accordance with the set of selected sample points, adjusting the variable dimensions of the devices of the ECD.

In a seventh aspect of the present invention, there is provided a system to size an electrical circuit design (ECD), the ECD having process variables and environmental variables associated thereto, the process variables defining a process variables space, the environmental variables defining an environmental variables space, the ECD having devices, the devices having associated thereto variable dimensions, the variables dimensions having associated thereto a first set of sizes, the ECD further having associated thereto a plurality of performance metrics, the system comprising: a database to store the process variables and environmental variables; a sampler in communication with the database, the sampler to sample the process variables space to obtain a first set of sample points; an ECD simulator in communication with the sampler, the ECD simulator to automatically simulate the ECD, in accordance with the first set of sizes, at the first set of sample points to obtain first simulation data, the ECD simulator to calculate, for each of the sample points a value of at least one of the performance metrics in accordance with the first simulation data to obtain a first set of performance data; a design point selection module (DPSM) in communication with the sampler and the ECD simulator, the DPSM to determine if a portion of the first set of performance data is outside pre-determined boundaries, the DPSM to select, if a portion the first set of performance data is outside the pre-determined boundaries, from the first set of samples points, in accordance with the first set of performance data and in accordance with pre-determined rules, samples points to obtain a set of selected sample points; a display module in communication with the DPSM, the display module to display to a user at least one of the set of selected sample points, the pre-determined rules, and the value for each performance metric; a user input module in communication with at least the DPSM, the user input module to input changes to at least one of the set of selected sample points, the pre-determined rules, and the value for each performance metric; and a sizing module in communication with the DPSM, the sizing module to vary at least one size of the first set of sizes, in accordance with changes input by the user, to obtain a second set of sizes, the ECD simulator to simulate, in accordance with the second set of sizes, at the set of selected sample points to obtain second simulation data, the DPSM to calculate a value for each performance metric in accordance with the second simulation data to obtain a second set of performance data, the DPSM to determine if the second set of performance data is outside pre-determined boundaries.

In an eight aspect of the invention, there is provided a computer-readable medium having recorded thereon statements and instructions for execution by a computer to carry out a method to size an electrical circuit design (ECD), the ECD having process variables and environmental variables associated thereto, the process variables defining a process variables space, the environmental variables defining an environmental variables space, the ECD having devices, the devices having associated thereto variable dimensions, the variables dimensions having associated thereto a first set of sizes, the ECD further having associated thereto a plurality of performance metrics, the method comprising steps of: sampling at least one of the process variables space and the environmental variables space to obtain a first set of sample points; automatically simulating the ECD, in accordance with the first set of sizes, at the first set of sample points to obtain first simulation data; calculating a value for each performance metric in accordance with the first simulation data to obtain a first set of performance data; determining if a portion of the first set of performance data is outside pre-determined boundaries; if a portion the first set of performance data is outside the pre-determined boundaries, selecting, from the first set of samples points, in accordance with the first set of performance data and in accordance with pre-determined rules, samples points to obtain a set of selected sample points; varying at least one size of the first set of sizes to obtain a second set of sizes; simulating the ECD, in accordance with the second set of sizes, at the set of selected sample points to obtain second simulation data; calculating a value for each performance metric in accordance with the second simulation data to obtain a second set of performance data; determining if the second set of performance data is inside the pre-determined boundaries; and if the second set of performance data is inside the pre-determined boundaries, storing the second set sizes a memory.

In a ninth aspect of the present invention, there is provide a computer-readable medium having recorded thereon statements and instructions for execution by a computer to carry out a method to size an electrical circuit design (ECD), the ECD having associated thereto design variables, process variables, and environmental variables, the design variables, process variables and environmental variables respectively defining a design variables space, a process variables space and an environmental variables space, the ECD having devices, the devices having associated thereto variable dimensions, the variable dimensions being part of the design variables, the variables dimensions having associated thereto a first set of sizes, the ECD further having associated thereto performance metrics, the method comprising steps of: sampling the process variables space to obtain a first set of sample points; automatically simulating the ECD at the first set of sample points, in accordance with the first set of sizes, to obtain first simulation data; calculating, in accordance with the first simulation data, for each of the sample points, a value of at least one of the performance metrics to obtain a first set of performance data; calculating, in accordance with the first set of performance data, an impact of each process variable on the at least one of the performance metrics; calculating, in accordance with the impact of each process variable on the at least one of the performance metrics, an impact of each device on the at least one of the performance metrics; identifying, in accordance with the impact of each device on the at least one of the performance metrics, one or more devices each having an impact on the at least one of the performance metrics that is less than a pre-determined minimum impact, to obtain a lowest impact device set; identifying design variables upon which the lowest impact device set depends, to obtain identified design variables, the identified design variables including at least one size of the first set of sizes; fixing each of the identified design variables to a constant value, to have the first set of sizes include fixed sizes and variables sizes; varying at least one variable size of the first set of sizes to obtain a second set of sizes; selecting, from the first set of sample points, in accordance with the first set of performance data, and in accordance with pre-determined rules, a second set of sample points; automatically simulating the ECD, at the second set of sample points, for the second set of sizes, to obtain second simulation data; calculating, in accordance with the second simulation data, a value of each of the performance metrics to obtain a second set of performance data; determining if the second set of performance data is outside pre-determined boundaries; if the second set of performance data is outside the pre-determined boundaries, varying at least one size of the second set of sizes to obtain a third set of sizes; automatically simulating the ECD, at the second set of sample points, for the third set of sizes, to obtain third simulation data; calculating, in accordance with the third simulation data, a value of the performance metric to obtain a third set of performance data; determining if the third set of performance data is outside the pre-determined boundaries; and if the third set of performance data is inside the pre-determined boundaries, storing the third set sizes in a memory.

In a tenth aspect of the present invention, there is provided a computer-readable medium having recorded thereon statements and instructions for execution by a computer to carry out a method to size an electrical circuit design (ECD), the ECD having associated thereto design variables, process variables, and environmental variables, the design variables, process variables and environmental variables respectively defining a design variables space, a process variables space and an environmental variables space, the ECD having associated thereto a set of design corners representing a sample of the process variables space, the ECD having devices, the devices having associated thereto variable sizes, the variable sizes being part of the design variables, the ECD further having associated thereto performance metrics, the method comprising steps of: sampling the design variables space to obtain a first set of candidate designs; automatically simulating each candidate design at each design corner, to obtain first simulation data; calculating, in accordance with the first simulation data, for each candidate design, a value of at least one of the performance metrics to obtain a first set of performance data; calculating, in accordance with the first set of candidate designs and the first set of performance data, an impact of each design variable on the at least one of the performance metrics, to obtain impact data; identifying, in accordance with the impact data, one or more design variables, to obtain identified design variables, each identified design variable having an impact on the at least one of the performance metrics that is less than a pre-determined maximum impact; reducing the design variables space by fixing each of the identified design variables to a constant value, to obtain a reduced design variables space; assigning, for each design variable of the reduced design variables space, a first size value to obtain a first set of sizes; automatically simulating the ECD, in accordance with the set of design corners, for the first set of sizes, to obtain second simulation data; calculating, in accordance with the second simulation data, a value of the at least one performance metric to obtain a second set of performance data; determining if the second set of performance data is outside pre-determined boundaries; if the second set of performance data is outside the pre-determined boundaries, varying at least one size of the first set of sizes to obtain a second set of sizes; automatically simulating the ECD, in accordance with the set of design corners, at the second set of sizes, to obtain third simulation data; calculating, in accordance with the third simulation data, a value of the at least one performance metric to obtain a third set of performance data; determining if the third set of performance data is outside the pre-determined boundaries; and if the third set of performance data is inside the pre-determined boundaries, storing the second set sizes in a memory.

In an eleventh aspect of the present invention, there is provided a computer-readable medium having recorded thereon statements and instructions for execution by a computer to carry out a method to size an electrical circuit design (ECD), the ECD having process variables and environmental variables associated thereto, the process variables defining a process variables space, the environmental variables defining an environmental variables space, the ECD having devices, the devices having associated thereto variable dimensions, the variables dimensions having associated thereto a first set of sizes, the ECD further having associated thereto a plurality of performance metrics, the method comprising steps of: sampling at least one of the process variables space and the environmental variables space to obtain a first set of sample points; automatically simulating the ECD, in accordance with the first set of sizes, at the first set of sample points to obtain first simulation data; calculating a value for each performance metric in accordance with the first simulation data to obtain a first set of performance data; determining if a portion of the first set of performance data is outside pre-determined boundaries; if a portion the first set of performance data is outside the pre-determined boundaries, selecting, from the first set of samples points, in accordance with the first set of performance data and in accordance with pre-determined rules, samples points to obtain a set of selected sample points; and outputting the set of selected sample points to a computer aided design (CAD) module for the CAD module to adjust the variable dimensions of the devices.

BRIEF DESCRIPTION OF THE DRAWINGS

Embodiments of the present invention will now be described, by way of example only, with reference to the attached Figures, wherein.

DETAILED DESCRIPTION

Figure 1:
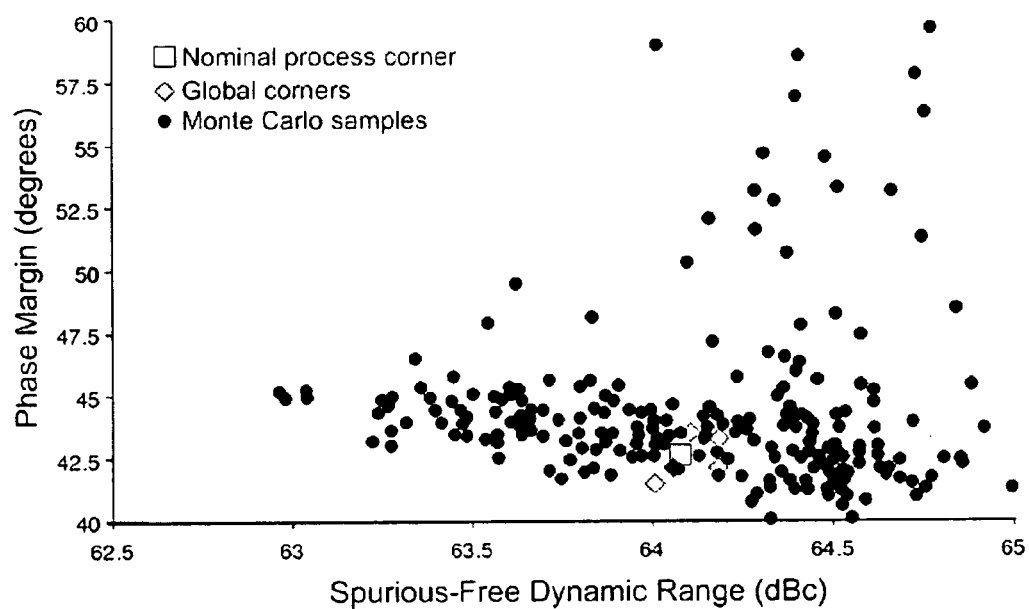
FIG. 1 shows a scatter plot Phase Margin as a function of Spurious-free Dynamic Range for a gain-boosted operational amplifier designed using a 90 nm CMOS process.

Generally, the present invention provides a method and system for sizing ECDs, the system and method that accounting for local and global process variations, and environmental variations. In addition, the present invention provides a method and system for choosing and pruning design points in process variables space and environmental variables space and a method and system for pruning a space of possible circuit sizings.

The present invention provides tools that overcome the limitations of previous tools. First is a tool and flow that allows the analog designer to efficiently choose device sizes for circuits of small, medium, and larger size at the cell level, taking into account local process variation, global process variation, and environmental conditions to aim for 100% yielding circuits. It overcomes the issues of the state-of-the-art approach by providing a means to handle larger numbers of design variables and/or larger numbers of performance metrics, i.e. handle larger circuits. It does this via data-mining and related techniques which prune the design space, and which choose & prune the corners. Like the state-of-the-art, it supports varying degrees of automation. The flow is as follows:

1. corners={typical global process corner & typical environmental corner}
2. (optional) prune and/or provide bias to regions of design space, using one of the techniques describe later
3. change device sizes to meet specifications at corners, using SPICE for feedback
4. do Monte Carlo (or similar) sampling on new design
5. if stopping conditions are met (e.g. target yield is hit), stop
6. do pruned process-corner discovery using one of the techniques described later
7. go to step 2

A variant of the above flow is to enter into it at step 4 with an initially sized design, then proceed as usual. Another variant is to have a different set of corners in step 1 (e.g. typical global process corner and many environmental corners).

In addition, the invention is a second tool and flow that provides a means to choose and prune the process & environmental corners which can then subsequently be used as inputs to other CAD tools. Its payoff is: better quality designs because the corners chosen are more representative of the actual variation; faster time to design closure because generating representative corners is efficient. It will multiply the payoff of other tools that use it because they can use corners with these characteristics.

Figure 2:
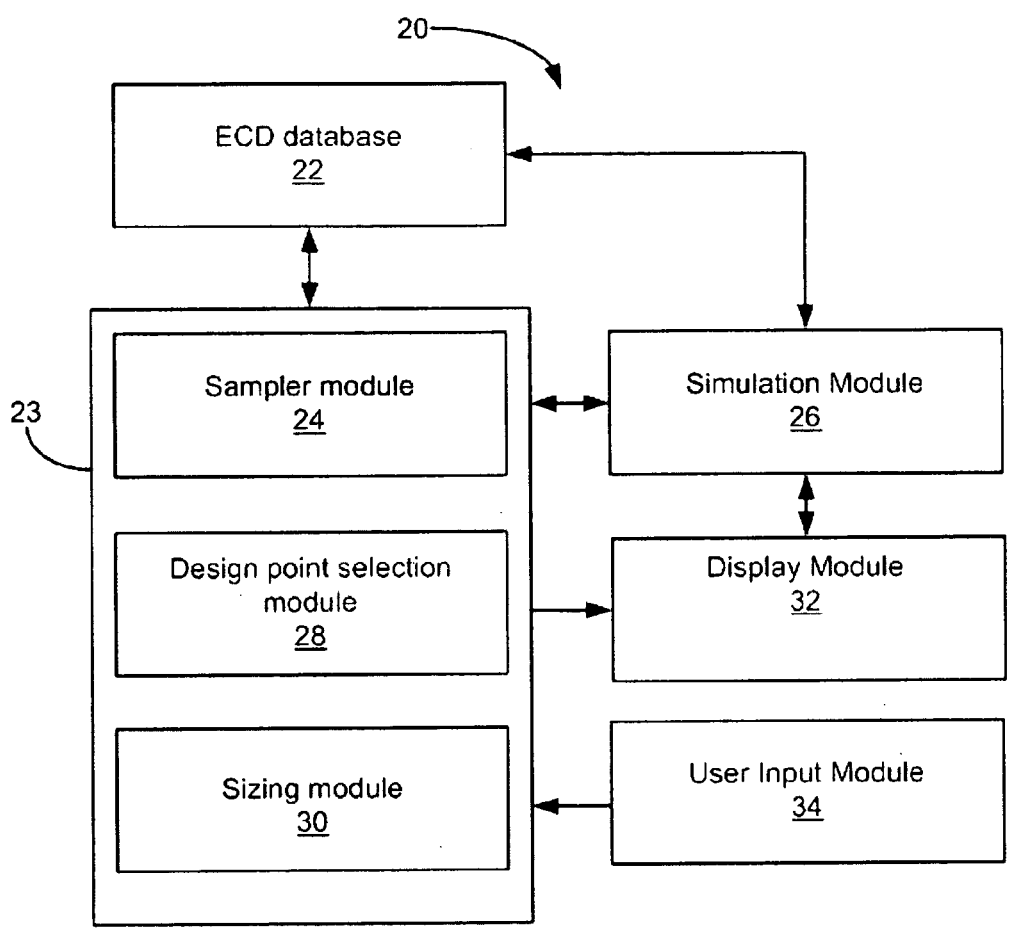
FIG. 2 shows an exemplary system of the present invention.

FIG. 2 shows an exemplary embodiment of an ECD sizing system 20 of the present invention. The system 20 includes an ECD database 20 that is in communication with a processor module 23, which includes a sampler module 24, a design point selection module (DPSM) 28 and a sizing module 30. The processor module 23 is connected to a simulation module 26, a display module 32, and a user input module 34.

The ECD database 22 can include the ECD's topology specifications represented as a netlist or as a schematic, performance metrics, design variables, process variables, environmental variables of the ECD, and any other suitable ECD-related information. The ECD database 22 can also define the steps to be followed to measure performance metrics of the ECD as a function of the ECD's several variables (e.g., how to measure the power consumption of the ECD). The ECD database can further include an initial setting of the sizes (and of any other design variables) associated to devices of the ECD. The ECD database 22 can be of any suitable type. That is, the ECD database 22 need not be a full-fledged relational database supporting advanced queries; it could merely be, for example, a collection of files residing in a set of directories possibly across several machines.

The performance metrics of the ECD can be a function of the variables specified in the ECD database 22. The design variables can include, e.g., widths and lengths of devices of the ECD, i.e., adjustable dimensions of device features. The process variables can be related to random variations in the ECD manufacturing. The environmental variables can include, e.g., temperature, load conditions and power supply. The ECD database 22 can also include, amongst others, further information about design variables, such as minimum and maximum values that features of the ECD's topology can take. The ECD database 22 can also include constraints for each performance metric (e.g., power consumption <1 mW), device models (e.g., MOS model files), and a random joint probability density function (jpdf), or any other suitable density function, of process parameters to model manufacturing variation or, at least a way to draw random points from the jpdf, even if the jpdf itself is not directly accessible.

As will be understood by the skilled worker, the procedure to be followed to measure the performance metrics of the ECD can be in the form of circuit test benches (test harnesses) that are combined with the netlist to form an ultimate netlist. The ultimate netlist can be simulated by the simulation module 26, which is in communication with the ECD database 22. The simulation module 26 can include, for example, one or more circuit simulators such as, for example, SPICE simulators. Results from simulations performed by the simulation module 26 can be stored in the ECD database 22.

In the context of the present invention, the sampler module 24 selects, in accordance with data stored in the ECD database, process points and/or environmental points, and a set of simulations. The simulations are invoked through the simulation module 26, in order to gather more information about a design point (circuit sizing) of the ECD in question. For example, information that can be obtained from the simulation results includes a yield estimate, and/or any other suitable information that can stored in the ECD database 22, and/or be presented to a user of the system 20 through the display module 32. A common form of sampling that can be performed by the sampler module 24 is Monte Carlo sampling (MCS) in which, e.g., N process points are drawn from the ECD database 22 in accordance with a pre-determined probability distribution that models manufacturing variations. For each process point, each user-specified (or pre-determined) circuit analysis (e.g., AC, DC, transient), and each environmental point for that analysis, a circuit simulation is performed, from which a performance metric of the ECD can be extracted (e.g., power consumption, gain). One method of calculating yield is to merely count the number of feasible process points, that is, the number of process points that have met all performance constraints across all environmental points, and divide by N, the total number of process points.

The simulations performed by the simulation module 26 can be readily displayed to the user through the display module 32 in any suitable format. For example, a waveform of voltage or current for a given pair of variables (process point, environmental point) can be displayed. As another example, multiple waveforms can also be displayed simultaneously to the user. Further examples include displaying simulation results as performance metric measurements scatter plots in one, two, or three dimensions. Furthermore, worst-case performance measurements, as measured across environmental points, can be displayed to the user. As yet another example, histograms, and box plots can be displayed to show a distribution of a given performance metric measurement.

As will be understood by a person skilled in the art, the sampler module 24 can perform any suitable type of sampling such as MCS or Latin Hypercube Sampling (LHS). LHS is similar to MCS except that in LHS, there is intrinsically at least one process point in every pre-specified sub-region of process variables space (or environmental variables space). This can enhance consistency of sampling and typically allows for convergence to tighter confidence intervals (e.g., in calculating the yield estimate of an ECD) more quickly than MCS. LHS samples can be displayed through the display module 32, just as MCS samples, and yield estimated in the same way. Another example of sampling that can be performed by the sampler module 24 is importance sampling, in which there is a bias in drawing samples in process variables space, the bias being towards the boundary between infeasible and feasible design points of the ECD. This approach can make the confidence interval in the yield estimate tighten more rapidly than MCS or LHS.

The simulation module 26 can perform specified analyses on a given design (circuit topology and sizing), at specified process point(s) and environmental point(s), using any number of specified test harnesses. A circuit topology is composed of circuit devices (e.g. resistors, MOS transistors, or even larger building blocks with set behavior such as op amp models), and of the interconnections (wires, conductors) between the devices. Sometimes the topology can include extra components from parasitic extraction of a layout. A test harness is merely a representation of more devices, and interconnections, plus energy sources (e.g. oscillating voltage), and means of measurement (e.g., probes on given nodes and/or mathematical formulae that ultimately output scalar values of performance) to be connected to the ECD. The simulation module 26 typically solves one or more sets of differential equations as part of its analysis. In the context of circuit design software, "SPICE" refers to a particular class of simulation modules that are very popular.

The DPSM 28 takes as input design points (also referred to as design corners, or simply "corners") sampled by the sampler module 24 in accordance with the ECD particulars defined in the ECD database 22. The DPSM 28 can also take as input any other suitable design points (e.g., design points determined in accordance with historical data for similar ECDs). The input taken from the sampler module 24 can be MCS data, LHS data, importance sampling data, or any other suitable sampling data. The selected design points can be obtained from the ECD database 22 or can be passed on to the DPSM 28 directly from the sampler module 24. The selected design points can be displayed to the designer through the display module 32, used by the designer, and/or output for use by other tools (e.g., CAD tools). Further, as will described later, other inputs to the DPSM 28 can include, for example, a previous round of corners to be pruned, and user specifications such as the maximum number of corners allowed, maximum number of simulations, maximum runtime, target yield, and any other suitable strategy parameters. A general aim of corner discovery approaches (i.e., of design point selection) is to have a set of corners that are representative enough of the yield-improvement problem such that if all constraints are met on all the corners, then the yield can approach, or hit, 100%, and even improve the margin of performances (e.g., improve process capability "Cpk"). A secondary aim of corner discovery (design point selection) is that the corners should not be impossible, near-impossible, or impractical to meet. For example, if target gain is >60 db then there is no need to have a corner that tends to return gains of 130 db. An additional aim of corner discovery is that the number of corners should be minimal, or at least the total time to simulate on all corners should be minimal. Further, another aim of corner discovery would be to have the user/designer understand how the corners were selected/generated, and have a means to understand why each specific corner is chosen.

There are numerous approaches that can be used by the DPSM 28 to select design points/corners. Exemplary approaches are summarized in Table I.

TABLE I

| Approach/Description | Designer Question Targeted | How are the design points obtained? |
|---|---|---|
| Approach I: min/max performance corners | Which corners capture bounds of metric performances? | From "sampling" data: for each performance metric, select the corner that gives the metric's max value, and the one that gives min value. |
| Approach II: tradeoff performance bounds | Like approach I, but this only gives the corners that cause performance metrics to become poor (rather than both directions); and it captures corners which may not be extremes for a given metric but capture an intermediate "poor" for many metrics | From "sampling" data, select corners by computing tradeoff where aims are opposite of usual (e.g., inverse non-dominated filtering) |
| Approach III: representative subset of tradeoff performance bounds | Like approach II, but this has gives fewer corners | Like approach II, but then cluster them down using distance measured in performance space (not process variable/environmental variable space) |
| Approach IV: worst-case performance corners | Which corners capture worst-case metric performances? (similar to approach I, but only gives worst-case rather than min and max) | From "sampling" data: for each performance metric, select the corner that gives the metric's worst-case value. |
| Approach V: representative subset of worst-case performance corners | Like IV, but this gives fewer corners | Like IV, but then cluster down using distance measured in process/environmental variable space (not performance space). |
| Approach VI: worst-case infeasibility-causing corners | Which corners capture worst-case performances on metrics that are still infeasible? (Similar to approach II, but only considers metrics that are infeasible) | From "sampling" data: for each performance metric that is sometimes infeasible, select the corner that gives the metric's worst-case value. |
| Approach VII: representative subset of worst-case infeasibility-causing corners | Like VI, but this gives fewer corners | Like VI, but then cluster down using distance measured in process/environmental variable space (not performance space). |
| Approach VIII: meanest overall corner | What single corner hurts yield the most? | From "sampling" data: For each (process, analysis, environmental point) compute the violation on each constraint (and scaled to [0, 1] using the min/max seen for that metric on the sampling data). Choose the (process, an, environmental point) that causes the highest violation. |
| Approach IX: meanest corner per analysis | For each analysis, what single corner hurts yield the most? (Gives optimal combination of coverage of analyses and payoff-per-analysis) | Like VIII, but choose the meanest from each analysis, not just meanest overall |
| Further approaches can be based on modeling of process variables. | Model-based version of some of the previous approaches | Build model for each performance metric that maps process variables to worst-case performance, or process variables and environmental variables to worst-case performance, etc . . . , then optimize on the model to find process points that meet the criteria of the approach optimally. |

Figure 3:
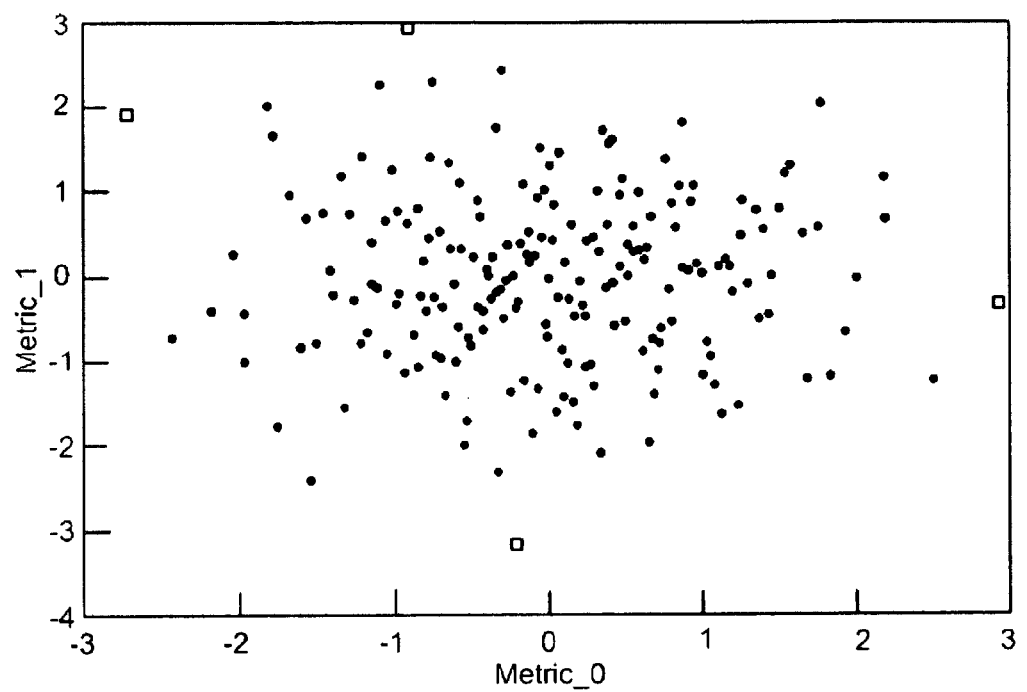
FIG. 3 shows a plot of simulated data and of corners selected in accordance with a first exemplary method of the present invention.

In a first approach, the DPSM 28 selects design points that capture the bounds of each performance metric of the ECD. In order to do so, each performance metric of each design point sampled by the sampler module 24 is calculated by the simulation module 26, and can be stored in the ECD database 22. The DPSM 28 accesses the ECD database 22 and selects, for each performance metric, a design point having a maximum performance metric value, and a design point having a minimum performance metric value. FIG. 3 shows an example of this type of design point selection for an ECD having two performance metrics. As seen in the scatter plot of FIG. 3, the selected design points, denoted by open squares, are attributable to a maximum and a minimum value for each performance metric.

Figure 4:
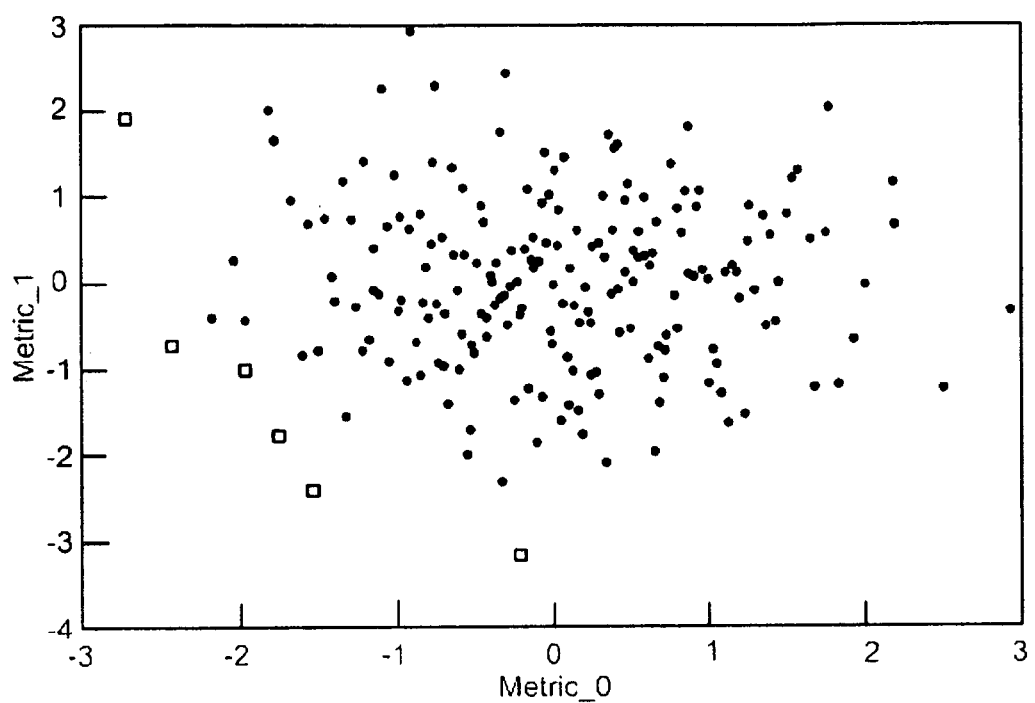
FIG. 4 shows a plot of simulated data and of corners selected in accordance with a second exemplary method of the present invention.

Another approach that can be used by the DPSM 28 to select design points/corners is by performing inverse non-dominated filtering on the performance metrics of the design points sampled by the sampler. Non-dominated filtering finds a set of non-dominated points, where each point is nondominated only if it its performance metrics vector is not dominated by any other points' performance metric vectors. A performance metrics vector p1 dominates another vector p2 if p1's performance metric values are at least as good as each of p2's metric values, and better than at least one of p2's metric values. Inverse nondominated filtering is like nondominated filtering, except for each performance metric, the direction of "good" vs "bad" is reversed. For example, in nondominated filtering the direction of a "good" power consumption is to minimize, and "bad" is to maximize; whereas in inverse nondominated filtering the direction of "good" power consumption is to maximize, and "bad" is to minimize. FIG. 4 shows an example of this type of design point selection for the same ECD having the same two performance metrics analyzed at FIG. 3. As seen in the scatter plot of FIG. 4, the selected design points, denoted by open squares, are disposed somewhat along a low performance contour.

Figure 5:
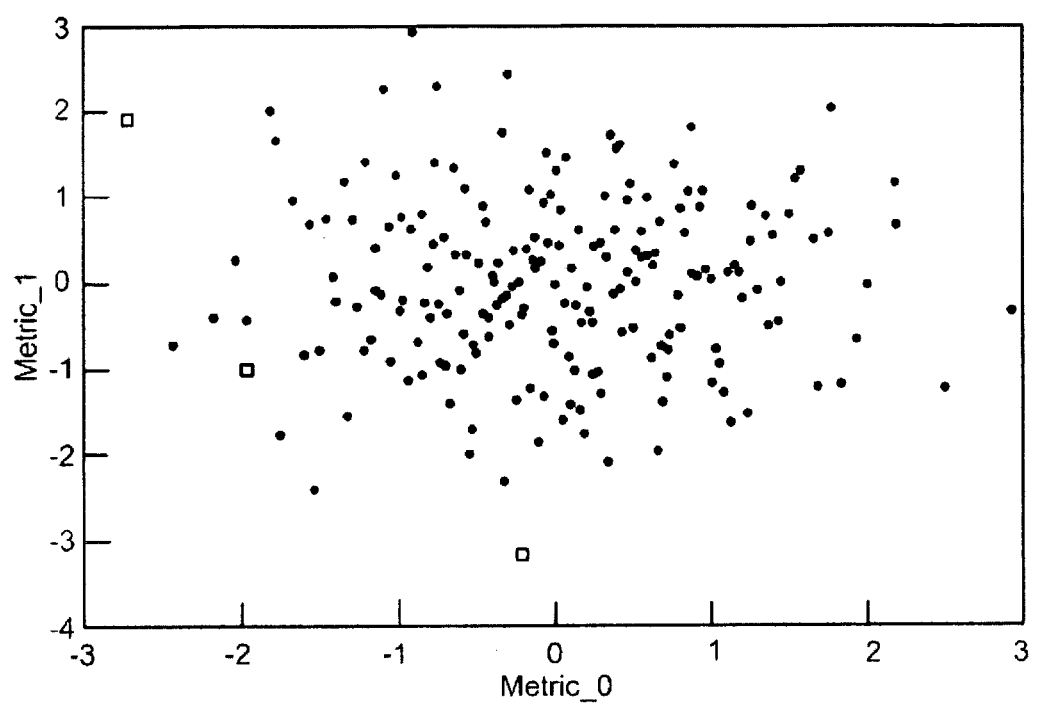
FIG. 5 shows a plot of simulated data and of corners selected in accordance with a third exemplary method of the present invention.

Yet another approach that can be used by the DPSM 28 is to cluster design points selected by inverse non-dominated filtering based on a distance measurement in metric space. FIG. 5 shows how the six selected design points of FIG. 4 have been clustered into three design points, denoted by open squares.

A further approach that can be used by the DPSM 28 to select design points/corners is to select corners that capture worst-case performance metric values. The worst-case performance metric value is a maximum metric value when, by definition, the metric value should be minimized in the ECD. The worst-case performance metric value is also a maximum metric value when, by definition, the metric value should be greater than, or equal to a threshold value. Conversely, the worst-case performance metric value is a minimum metric value when, by definition, the metric value should be maximized by the ECD and, the worst-case performance metric value is also a minimum metric value when, by definition, the metric value should be less than, or equal to a threshold value.

An additional approach that can be used by the DPSM 28 is to cluster design points selected by capturing worst-case performance metric values. In this case, the clustering can be performed in process variables space and/or environmental variables space. That is, design points that have worst-case performance metric values, and that are near each other in process variables space and/or environmental variables space can be clustered.

Another approach that can be used by the DPSM 28 to select design points/corners is to select corners that capture worst-case performance metric values as described above and then, from these selected corners, choose corners that have infeasible values, an infeasible value being a value that is outside pre-determined boundaries. A design point having infeasible values can be a design point that fails with respect to each performance metric of the ECD. Further, the chosen corners can be clustered in process variables space and/or environmental variables space. That is, design points that have worst-case performance metric values, and that are near each other in process variables space and/or environmental variables space can be clustered.

A further approach that can be used by the DPSM 28 to select design points/corners is to select a single corner that is the most detrimental to the ECD's yield. This corner can be selected by simulating the sample points obtained by the sampler module 24 with a plurality of test harnesses and, for each of the plurality of simulations, to calculate, for each sample point, a yield of the ECD. The corner/design point having the worst yield is the one selected.

Another approach that can be used by the DPSM 28 to select design points/corners is to simulate the sample points obtained by the sampler module 24 with a plurality of test harnesses and, for each of the plurality of simulations, to calculate, for each sample point, a yield of the ECD. The corner/design points selected correspond to those with the worst yield for each test harness.

Yet another approach that can be used by the DPSM 28 to select design points/corners is to model each performance metric as a function of at least one of process variables and environmental variables, and to optimize each model to obtain, for each performance metric, a design point having a maximum value, and a design point having a minimum value. Alternatively, the optimization can be performed to obtain the design point having a minimum value only.

As described above, some of the approaches used by the DPSM 28 to select design points/corners apply inverse non-dominated filtering on the performance metric values, such that the corners that give the tradeoff of worst-case performances are selected. Also, several approaches apply clustering in performance space, or in process/environmental space in order to reduce the number of corners. Any suitable clustering algorithm can be used, such as, for example, k-means clustering, hierarchical agglomerative clustering, or fuzzy c-means clustering. Especially interesting for the clustering algorithms is that they can respond to user-input specification of maximum number of corners, which can be input through the user input module 34. Another technique that the DPSM 28 can use to select design points/corners is to define a corner as a 3-tuple of (process point, analysis, environmental point) instead of just a process point, or a (process point, environmental point). If just a process point was specified, then the designer would still have to simulate all analyses and environmental points at the given process point; and similarly for ignoring the analysis, whereas with an exact specification then it makes the simulation required to be fully specified.

Another technique that the DPSM 28 can use to select design points/corners is to consider only corners that cause unfeasibility. A further technique to select design points/corners to only consider corners that cause the highest constraint violation (difference between target specification and measured value). In order to fairly compare violations of different performance metrics, the violation measures need to be scaled to have substantially the same range. A simple way to do this for a given metric is to merely measure the maximum and minimum value found across all samples, and divide the violation by (maximum−minimum). Approach IX of Table I embodies this well: by choosing a corner for each analysis, it will return a value for each performance metric. By choosing the meanest corner at a given analysis, i.e., the corner that causes the highest constraint violation, it ensures that solving the meanest corner will likely solve other corners simultaneously (and is therefore efficient). Approaches such as the exemplary approaches listed in Table I can also be used in various combinations as well. From a user perspective, he may have an option of choosing which approach to apply to the sample data to select a set of corners, or he may just request the most representative corners and perhaps specify a maximum number of corners. The designer can also apply different filtering approaches sequentially. For example, the designer can use approach I in a first round of design point selection, and then, e.g., use approach VI in a subsequent round of design point selection.

Figure 6:
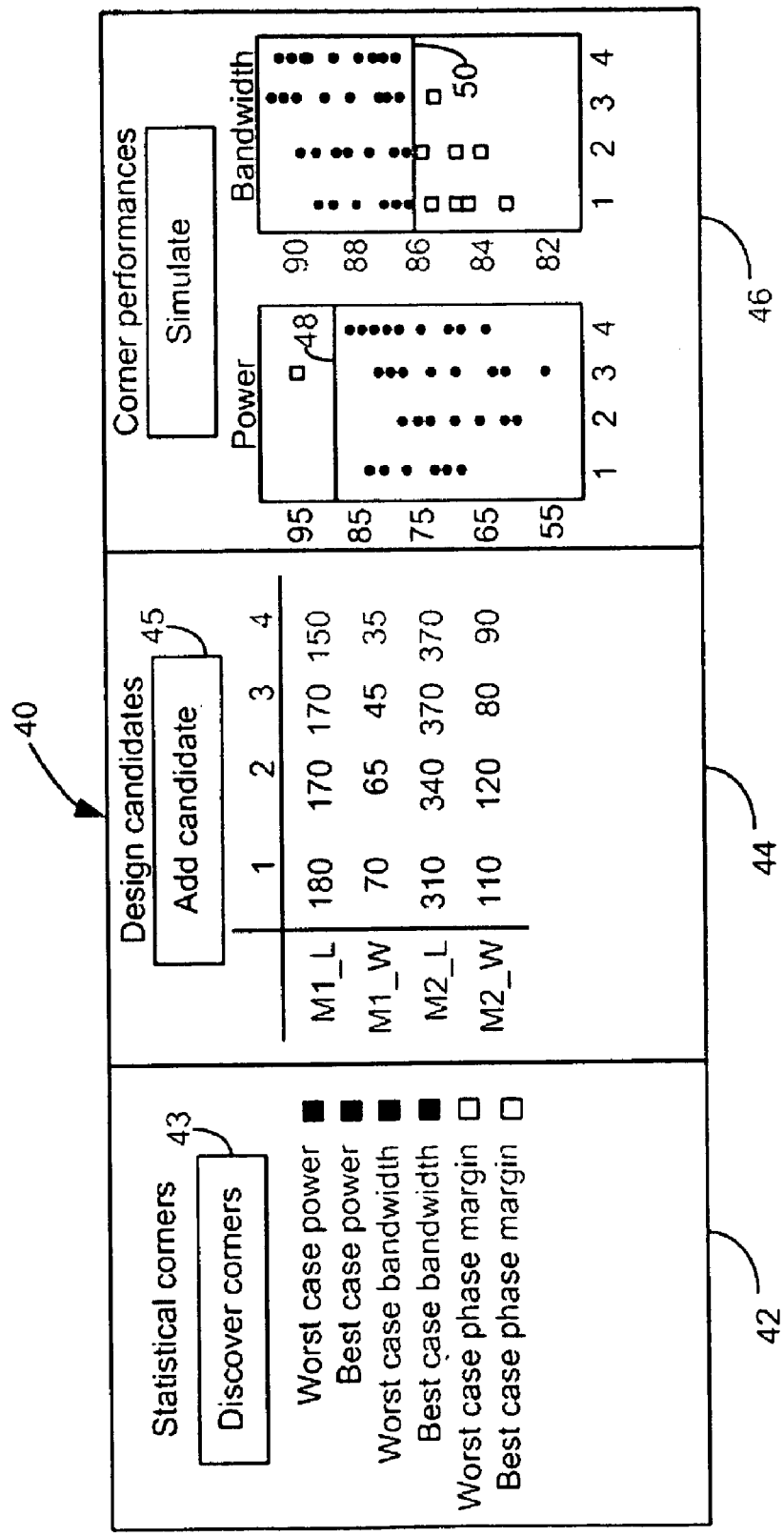
FIG. 6 shows an exemplary interface in accordance with the system of the present invention.

FIG. 6 shows an exemplary user interface 40 that can be displayed to the user/designer by the display module 32 during a sizing run of an ECD using the system 20. The interface 40 includes a statistical corners pane 42, a design candidate pane 44, and a corner performances pane 46. A pointing device such as, for example, a computer mouse, can be part of the user input module and used to select elements on the interface 40. The interface 40 is for an exemplary ECD having power, bandwidth, and phase margin as performance metrics. Further, the ECD in question has four variables sizes: M1_L, M1_W, M2_L and M2_W. As shown in the exemplary statistical corners pane 42, the corners (design points) selected by the DPSM 28 are those that have the worst-case power, the best-case power, the worst-case bandwidth and the best-case bandwidth. To discover such design points, the user clicks (or selects through any suitable means) the discover corners button 43. In the present example, four discovered design points (or design candidates) are presented to the user in the design candidate pane 44 as candidates 1 through 4. Even though four design candidates are shown in the present example, the present invention is applicable to any suitable number of design candidates. Each design candidate can have its size changed by the designer through the user input module 34. Further, the user can add one or more candidate manually by selecting the add candidate button 45, which invokes the sizing module 30. To simulate the design candidates the user can select the simulate button 47 in the corner performance pane 46. Alternatively, the simulation can be done automatically.

The corner performance pane 46 shows power and bandwidth for each of the candidate designs 1 through 4 for a series of simulations for each candidate design. The line 48 indicates a pre-determined maximum value for power and the line 50 indicates a pre-determined minimum value for bandwidth. The circles represent simulations meeting the pre-determined criteria of power and bandwidth. The squares represent simulations failing these pre-determined criteria.

As will be understood by the skilled worker, the statistical corners pane 42 provides the user with different choices of how to discover candidate designs. Alternatively, the user interface 40 can include a pane (not shown) where an interactive two-dimensional plot of design points, such as, e.g., those presented at FIGS. 3 to 5, that allows the user to select/unselect corners himself, e.g., by clicking on corners. Further, the user interface 40 can have a pane (not shown) listing corners that can be selected by the user. With the various embodiments of the user interface, the user/designer can select corners, design with them, simulate at them, save them to the ECD database 22, export them, etc. He may also load or import previously set corners from the ECD database 22. Once the corner performance pane 46 shows successful simulations only, the user can have confidence that the design candidates of the design candidate pane 44 are properly sized.

The sizing module 30 of the system 20 can support a fully manual design flow, a fully automatic flow, or a mix of manual and automatic flows. In the manual flow of the sizing module 30, the user changes design variables (sizings) through the user interface 40 and then invokes simulations across sample points to get feedback about performance metrics of the ECD, visualizes results, then repeats until convergence (e.g., all constraints on performance metrics are met on all design points). It is possible that a single button click can be used to invoke all the simulations and have all the results displayed to the user automatically through the display module 32. As will be understood by the skilled worker, the results can be displayed along with computations on top of raw results to aid intuition. With modern fast simulators and/or parallel processing, this turnaround time can be as quick as a few seconds. Therefore the flow for the user to manually size a circuit to be feasible on all the corners can be very rapid—it is possible for the user to design a 100% yield circuit in minutes, with full control. As seen at FIG. 6, the exemplary user interface 40 allows the user to select performance metrics criteria that are used as a basis for discovering corners. A click of the discover corners button 43 can cause the design candidates to be displayed automatically in the design candidates pane 44, and can cause simulation of these corners to be performed, and the results to be displayed automatically in the corner performance pane 46, and vice-versa. The corner performance pane 46 shows representations used to compare the results of each design candidate across the full statistical corners. There is a data point shown for each measurement that is output by SPICE simulation (or by any other suitable simulation). Each individual plot's x-axis includes a discrete value for each design candidate (1 through 4 in this example). For each design candidate, the set of corner values is represented as circles for corners where the specifications are being met, and as squares for corners where the specification is not being met. By placing the results for the design candidates next to one another, the designer can easily compare the results and pick the most promising design candidate.

The sizing module 30 can also support a fully automatic flow, in which any suitable embodied optimizing algorithm (i.e., an optimizer) can do substantially the same loop as manual sizing but in an automatic way. That is, the optimizer tries different sizings in accordance with pre-determined instructions, invokes simulations, gets feedback, and tries new sizings based on the feedback, until convergence. There could be a mix of manual and automation as well. For example, the user can supply a starting point from which the optimizer does a local optimization. Or, as another example, during the course of the optimization the user tracks progress via visual feedback through the display module, and, based on the progress, the user guides the optimizer, e.g., suggests new designs, changes the allowed design variable search space, changes the biases towards different objectives and constraints and corners, adds or removes corners, or stops the optimization run.

Figure 7:
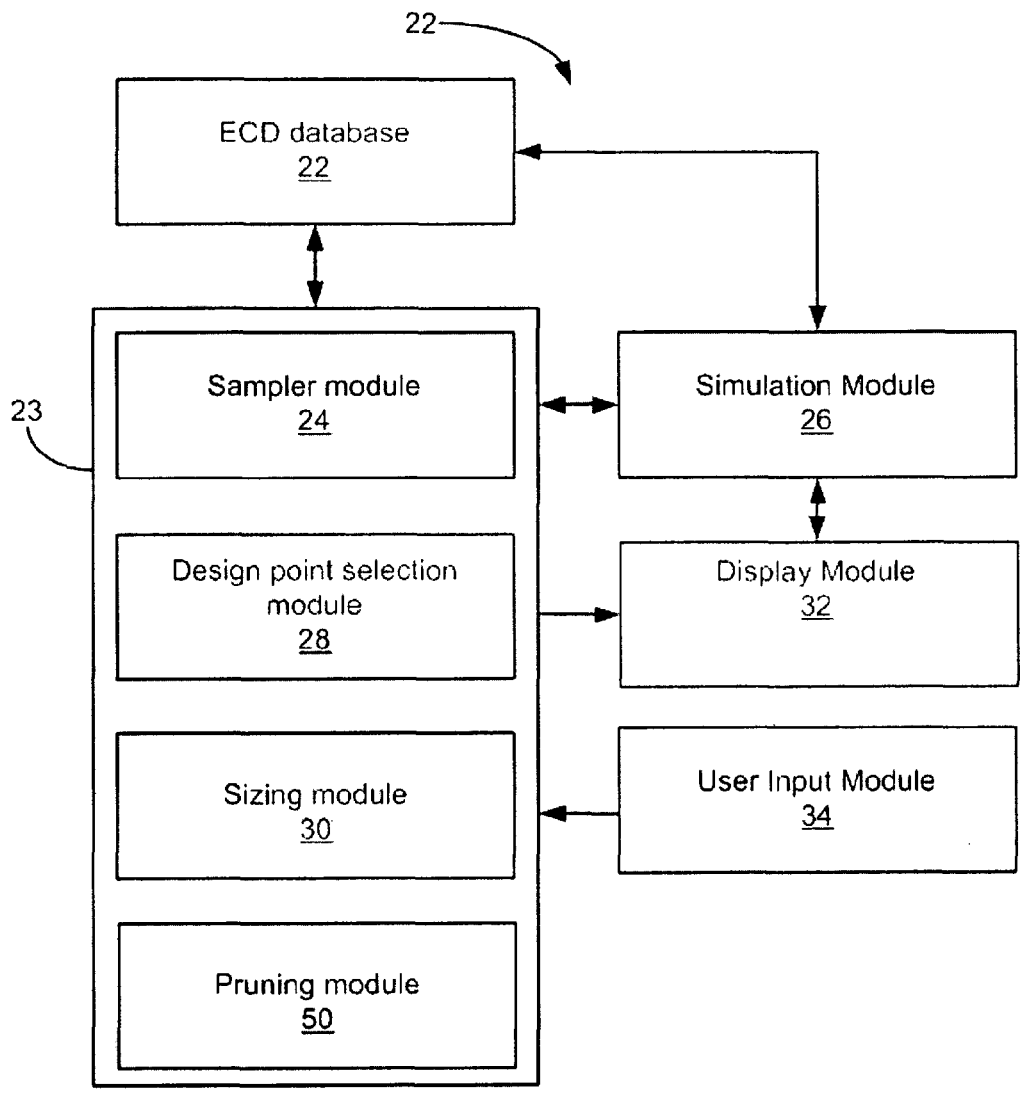
FIG. 7 shows another embodiment of the system of the present invention.

FIG. 7 shows another embodiment of the present invention. The system 21 of FIG. 7 differs from the system 20 described above in that the processor module 23 also includes a pruning module 50. As is described below, the pruning module 50 can drastically simplify the problem of sizing an ECD by pruning down the number of design variables to size.

The pruning module 50 takes as input, for a given ECD, the design points sampled by the sampler 24 and simulated by the simulation module 26. Based on this data, the simulation module 26 calculates a value of each performance metric of the ECD. The pruning module 50 then calculates an impact of each process variable (and/or environmental variables) on the performance metrics. Subsequently, the pruning module 50, based on the impact of each process variable on the performance metrics, calculates an impact of each device of the ECD on the performance metrics. The pruning module 50 then identifies the device (or devices) having the biggest impact on the performance metrics. Once the highest impact device (or devices) are identified, the pruning module identifies the design variables (sizes) of the ECD that are not present in the highest impact device(s) and sets to a constant value the identified variables.

Effectively, the pruning module 50 can greatly simplify the sizing of an ECD by identifying the design variables that have no relevance to the highest impact devices of the ECD, and, by assigning constant values to those identified variables. This allows the user to size the highest impact design variables (sizes) first without having to worry about the lesser important design variables. Alternatively, instead of setting the less important design variables to constant values, the pruning module 50 can communicate these variables, and their importance with respect to the highest impact devices, to the user through, e.g., the display module 32. The user can then assess the importance of the design variables and, in accordance with his assessment, select which ones to vary. This assessment in fact biases the user's choice in which design variables (sizes) to vary. Once the importance of the design variables has been assessed and/or the lowest importance variables set to constant values, the procedure for sizing the circuit is substantially the same as that described in relation to the interface 40 of FIG. 6.

In other words, the pruning module 50 takes the "sample data" as an input along with the overall design space, and outputs a reduced design space and/or biases. It prunes/biases the design space using the following steps: (1) from "sample data", extract relative importance of process variables (2) sum up relative importance of process variables across devices to get relative importance of devices (because each process variable is associated with a device) (3) freeze design variables that are not associated with the most important devices, and return the corresponding design space; or alternatively (3) return relative impacts of design variables and let those be treated by the user as biases of which variables to change.

The designer can then use the DPSM 28 in that reduced space. In the case where the space was pruned too much and he cannot hit the target design, the designer can expand the design space again. However, in most cases, the pruned design space contains designs that will meet the target performances at the corners.

The impact of the process variables on the performance metrics can be calculated in any suitable way. For example, one way is to compute correlations between process variables and feasibility, where the higher the absolute correlation between a process variable and feasibility means a higher impact. A related way is to use an analysis of variance, such as ANOVA, or related statistical inferences. Another possible way to calculate the impact of the process variables on the performance metrics is to build a two-class classifier mapping process variables to classes of {feasible, infeasible} sets of performance metrics, using the "sample data", obtained from the sampler module 24, to construct the input/output training data, then extract the relative importance of each variable in the mapping from the classifier. The building of the classifier can be automatic. A feasible set of performance metrics is one where all performance metric values satisfy pre-determined ECD criteria. An infeasible set of performance metrics can be one where one or more performance metric values fails to satisfy pre-determined ECD criteria.

Another way to obtain an impact of each process variable on the performance metrics of the ECD is to build one regression model for each performance metric to map the process variables to worst-case performance values (worst-case across environmental points), then, for each regression model extract the relative importance for each variable on the performance metric. This is followed by summing the relative importances (with or without weights on the sum). Some classifiers and regressors provide direct means to extract relative importance of variables, but some do not; a general way to extract relative importance from classifiers, or regressors, can be accomplished using a method that can be written as steps A through I below:

A) error_per_variable = { }
B) For each variable v
C)     error = 0
D)     Repeat num_scrambles times
E)         X_scr = X but randomly permute v's row
F)         y_scr = simulate regressor on X_scr
G)         error = error + rmse(y, y_scr)
H)     error_per_variable{v} = error
I) impacts = normalize error_per_variable The general idea of the algorithm is: the more error that occurs when a variable's inputs are "scrambled", then the more impact the variable has. Step A initializes the data structure error_per_variable, which is a map that will hold a scalar entry of "error" for each of the model's input variables. Step B starts the loop that iterates across each variable, to find that variable's error. The error is set to zero at step C. The loop will find the error by doing a random permutation of ("scrambling") the training inputs for that variable (step E), simulating the regressor with the modified training input data (step F) to get output values y_scr, and in step G computing the root-mean-squared-error (rmse) of y_scr compared to the known true values, y. Step G also updates the error for that variable v. It repeats steps D-G num_scrambles times for variable v, e.g., 50-500 times. Finally, step I normalizes the error_per_variable by merely dividing each error value by the sum of all error values.

Alternatively the pruning module 50 can be used to invoke ECD simulations, such as, e.g., SPICE simulations, simulating at different design points, i.e., for different sizes of the design variables, in order to gather data to extract design variable impacts directly instead of linking design variable impacts to random variable impacts via devices. There are many possible implementations of this approach.

One embodiment does (1) a space-filling sampling in design variable space (e.g., LHS in a uniform distribution bounded by design variable bounds), (2) at each design point, simulate at all the corners, and (3) extract design variable impacts from the simulation data, e.g., with correlation or one of the model-building approaches described above. Another embodiment would use a "growing" approach: (1) start with an initial design point (e.g. supplied by user) and an initial small hypercube about the design point; (2) set all design variables×{increase, decrease} as possible expansion directions; (3) do space-filling sampling in the design space defined by the hypercube; (4) simulate the new design points at corners; (5) prune away expansion directions that significantly hurt performance; and (6) stop if no directions left, else go to (3). These are two possible examples for "design space pruning" with SPICE simulation; however, any other suitable type of design space pruning can be used.

Figure 8:
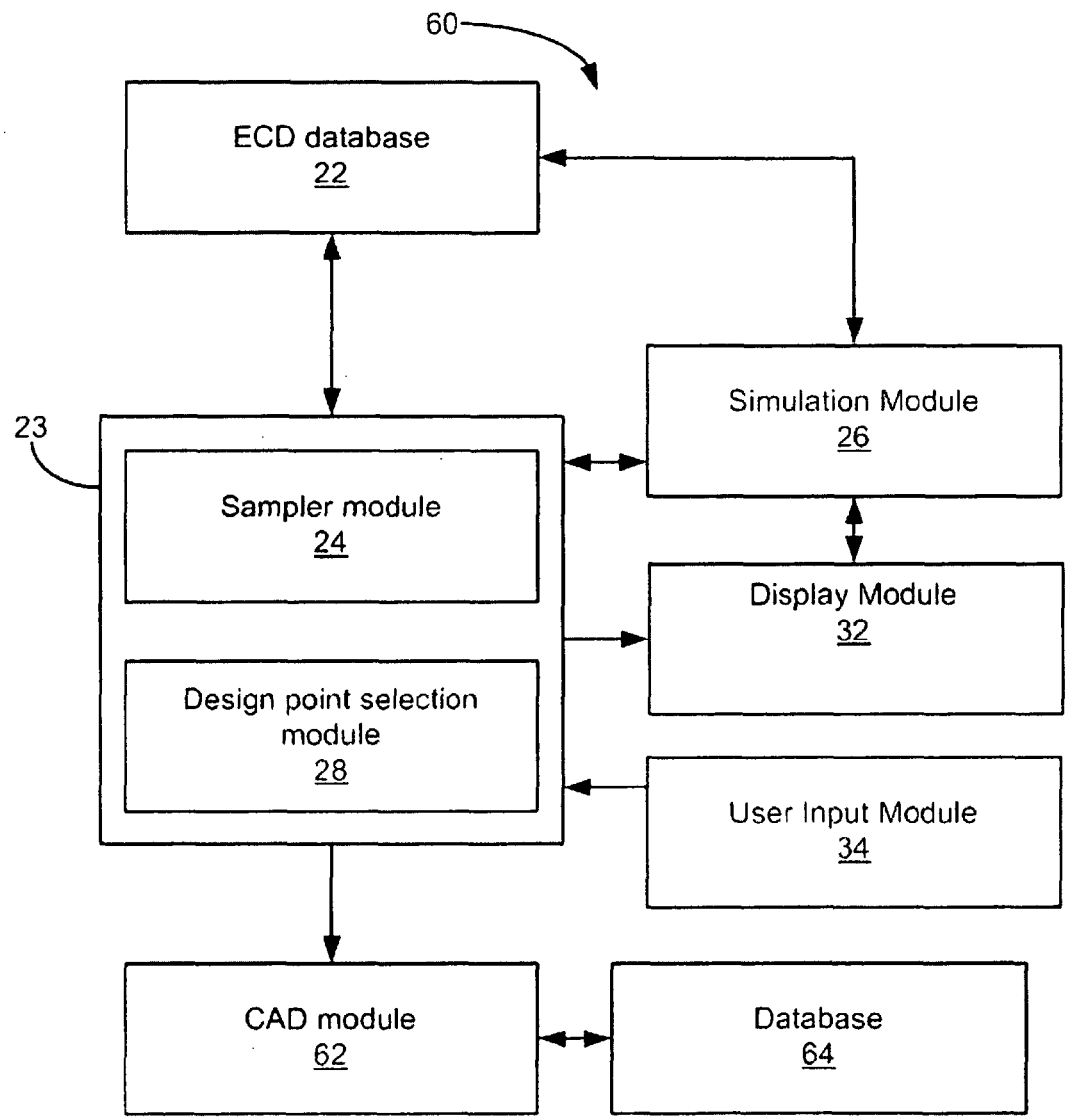
FIG. 8 shows yet another embodiment of the system of the present invention.

FIG. 8 shows another embodiment of a system of the present invention. The system 60 of FIG. 8 differs from the system 20 described above in that the processor module 23 does not include a sizing module. The processor module 23 of the system 60, instead of determining sizes of an ECD, outputs design candidates (design points/corners) to a CAD module 62, which uses its own methods to size the ECD. A database 64, containing data relevant to the CAD module can be in communication with the CAD module 62. The CAD module can be any CAD tool that naturally uses corners, such as, e.g., a timing analyzer, or an automated circuit sizer.

Figure 9:
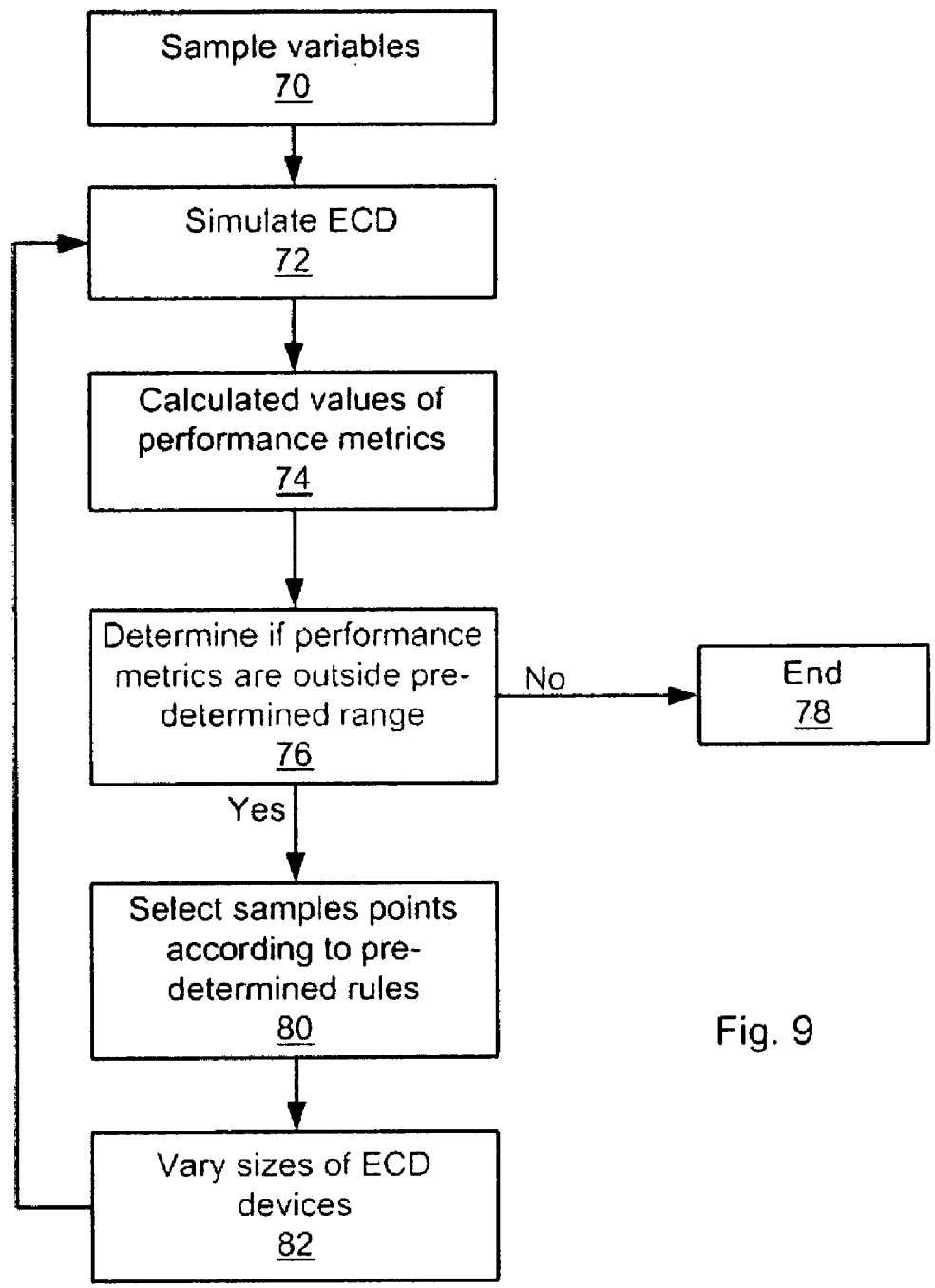
FIG. 9 shows a flowchart of a first exemplary method of the present invention.

FIG. 9 shows a flow chart of an exemplary method of sizing an ECD of the present invention. The ECD has an initial first set of sizes attributable to dimensions of ECD's devices. At step 70, at least one of process variables space and the environmental variables space are sampled to obtain a first set of sample points. Subsequently, at step 72, the ECD is simulated in accordance with the first set of sizes, at the first set of sample points to obtain first simulation data. At step 74, a value for each performance metric of the ECD is calculated in accordance with the first simulation data to obtain a first set of performance data. At step 76, it is determined if a portion of the first set of performance data is outside pre-determined boundaries. If the answer to the determination of step 76 is no, then the method end at step 78. However, if a portion of the first set of performance data is outside the pre-determined boundaries, then, at step 80 a selection, from the first set of samples points is made, in accordance with the first set of performance data and in accordance with pre-determined rules, samples points to obtain a set of selected sample points. This is followed, at step 82, with a step of varying at least one size of the first set of sizes to obtain a second set of sizes. Subsequently, steps 72 to 80 are repeated until the performance metrics are all within their respective pre-determined ranges. That is, the step of simulating the ECD, in accordance with the second set of sizes, at the set of selected sample points to obtain second simulation data, is performed. This is followed by calculating a value for each performance metric in accordance with the second simulation data to obtain a second set of performance data. Then, a step of determining if the second set of performance data is outside pre-determined boundaries is performed.

The pre-determined rules of step 80 can be in accordance with any of the approaches described above in relation to Table I. For example, the pre-determined rules can include selecting, for each performance metric, a sample point having a maximum performance value and a sample point having a minimum performance value. Further, the pre-determined rules can include selecting one or more sample points through inverse non-dominated filtering of the first set of sample points. Additionally, the inverse non-dominated filtering of the first set of sample points can be followed by a clustering of the sample points, the clustering being in accordance with a pre-determined performance scaling criteria. Any suitable clustering algorithm can be used such as, for example, k-means clustering, hierarchical agglomerative clustering, or fuzzy c-means clustering.

Further, the pre-determined rules can include selecting, for each performance metric, a sample point having a worst-case performance value, the worst-case performance value being one of: (a) a maximum performance value for a performance metric to be minimized in the ECD; (b) a maximum performance value for a performance metric that is to set equal or greater than a pre-determined threshold in the ECD; (c) a minimum performance value for a performance metric to be maximized in the ECD; and (d) a minimum performance value for a performance metric that is to set equal or smaller than a pre-determined threshold in the ECD. This can be followed by a clustering of the sample points in accordance with at least one of a pre-determined process variables space scaling criteria and a pre-determined environmental variables space scaling criteria. Alternatively, the minimum performance value criteria can be such that the minimum performance value is outside a pre-determined feasibility range. Additionally, selecting can be followed by a step of clustering a clustering of the sample points in accordance with at least one of a pre-determined process variables space scaling criteria and a pre-determined environmental variables space scaling criteria.

The step of automatically simulating the ECD can include simulating the ECD at the first set of sample points (corners), with a plurality of test harnesses, and the first simulation data can include simulation data for each test harness, the performance data including performance data for each test harness; and, the pre-determined rules include calculating, for each test harness, in accordance with its respective performance data, a yield of the ECD for each sample point; and selecting a sample point associated with a lowest yield of the ECD.

The step of automatically simulating the ECD can include simulating the ECD at the first set of sample points, with a plurality of test harnesses, the first simulation data including simulation data for each test harness, the performance data including performance data for each test harness; and, the pre-determined rules include calculating, for each test harness, in accordance with its respective performance data, a yield of the ECD for each sample point; and selecting, for each test harness, a sample point associated with a lowest yield of the ECD.

The step of selecting, for each performance metric, the sample point having a maximum performance value and the sample point having a minimum performance value, can include modeling each performance metric as a function of the at least one of the process variables space and the environmental variables space, to obtain a model of each performance metric; and, optimizing the model of each performance metric to obtain the sample point having a maximum performance value and the sample point having a minimum performance value.

The step of selecting, for each performance metric, the sample point having a worst-case performance value, can include: modeling each performance metric as a function of the at least one of the process variables space and the environmental variables space, to obtain a model of each performance metric; and optimizing the model of each performance metric to obtain the sample point having the worst-case performance value.

The step of selecting, for each performance metric, the sample point having a worst-case performance value can include: modeling each performance metric as a function of the at least one of the process variables space and the environmental variables space, to obtain a model of each performance metric. For each performance metric to be maximized in the ECD, the model of each performance metric is optimized to obtain a sample point having a respective minimum performance value. For each performance metric to be minimized in the ECD, the model of each performance metric is optimized to obtain the sample point having a respective maximum performance value.

The performance metrics can include at least one of an area of the ECD, power consumption, gain and bandwidth. Simulating the ECD can include simulating the ECD in accordance with an analog electronic circuit simulator. Sampling can include Monte Carlo sampling from a distribution describing manufacturing variations of the process variables. Sampling can include Latin Hypercube sampling from a distribution describing manufacturing variations of the process variables.

Figure 10:
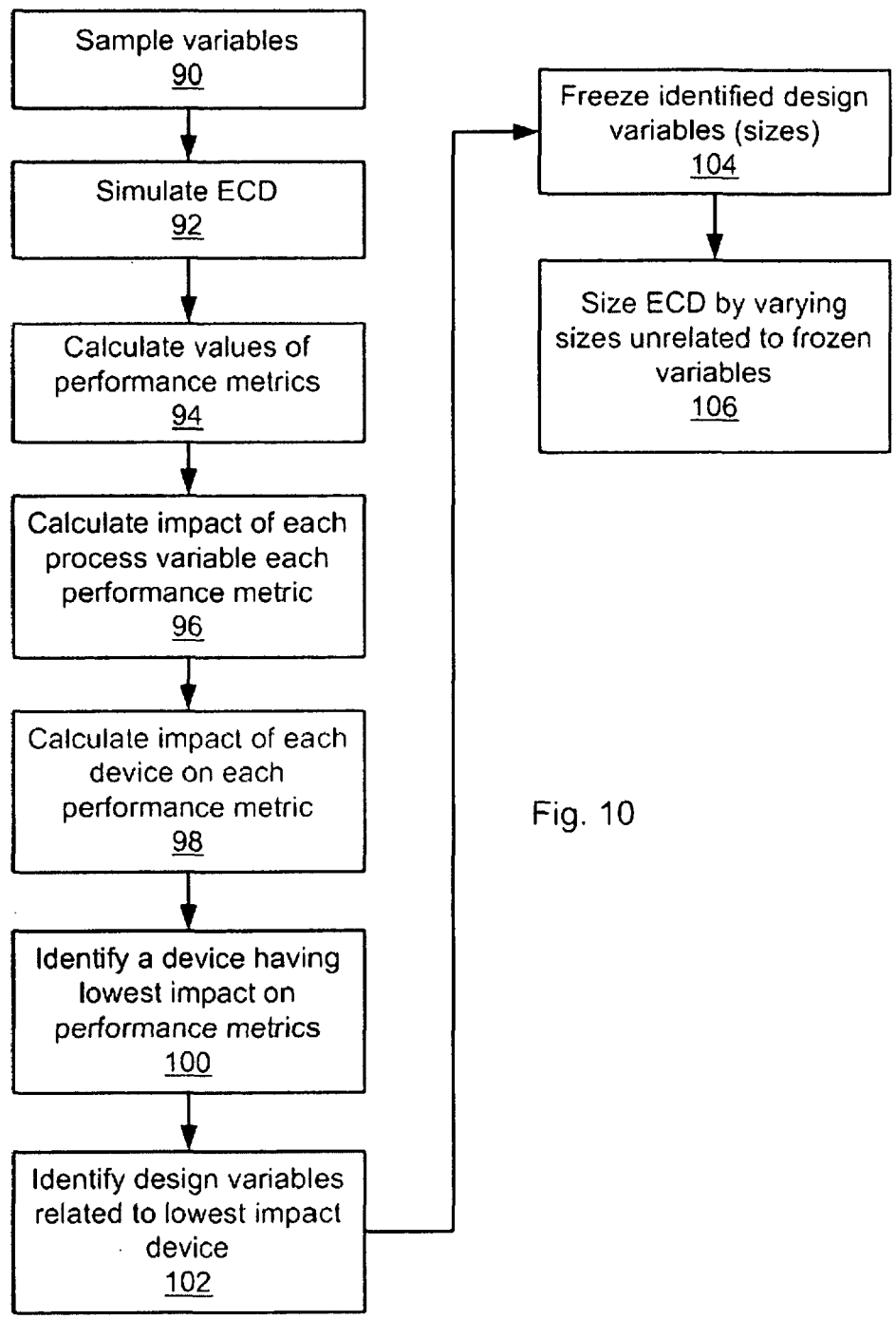
FIG. 10 shows a flowchart of a second exemplary method of the present invention.

FIG. 10 shows a flowchart of a flow chart of another exemplary method of sizing an ECD of the present invention. The exemplary method represented at FIG. 10 first reduces the number of variables to size before actually sizing these variables. This is accomplished by sampling the process variables, and, optionally, the environmental variables, at step 90. At step 92, the ECD is simulated in accordance with the sampled points. Values of the performance metrics of the ECD are calculated at step 94, in accordance with the sampled points obtained at step 92. At step 96, the impact of each process (and/or environmental) variables on each performance metric is calculated. Subsequently, at step 98, in accordance with the results obtained up to step 96, the impact of each device on each performance metric is calculated. Following this, at step 100, the ECDs device having the lowest impact on the performance metrics is identified and, at step 102, the design variables related to the lowest impact device are identified. At step 104, the design variables that are not related to the highest impact device are frozen. Finally, at step 106, the ECD is sized by varying only the variables related to the highest impact device. Any suitable method of sizing the ECD can be used at step 106, including any embodiment of the method shown at FIG. 9 and described above.

The exemplary method shown at FIG. 10 is to size an ECD that has associated thereto design variables, process variables, and environmental variables, the design variables, process variables and environmental variables respectively define a design variables space, a process variables space and an environmental variables space, the ECD has devices. The devices have associated thereto variable dimensions (sizes), the variable dimensions are part of the design variables. The variables dimensions have associated thereto a first set of sizes, the ECD further has associated thereto performance metrics. The method comprises steps of: sampling the process variables space to obtain a first set of sample points; automatically simulating the ECD at the first set of sample points, in accordance with the first set of sizes, to obtain first simulation data; calculating, in accordance with the first simulation data, for each of the sample points, a value of each of the at least one performance metrics to obtain a first set of performance data; calculating, in accordance with the first set of performance data, an impact of each process variable on the at least one of the performance metrics; calculating, in accordance with the impact of each process variable on the at least one of the performance metrics, an impact of each device on the at least one of the performance metrics; identifying, in accordance with the impact of each device on the at least one of the performance metrics, one or more devices each having an impact on the at least one of the performance metrics that is less that a pre-determined minimum impact, to obtain a lowest impact device; identifying design variables upon which the lowest impact device set depends, to obtain identified design variables, the identified design variables including at least one size of the first set of sizes; fixing each of the identified design variables to a constant value, to have the first set of sizes include fixed sizes and variables sizes; varying at least one variable size of the first set of sizes to obtain a second set of sizes; selecting, from the first set of sample points, in accordance with the first set of performance data, and in accordance with pre-determined rules, a second set of sample points; automatically simulating the ECD, at the second set of sample points, for the second set of sizes, to obtain second simulation data; calculating, in accordance with the second simulation data, a value of each of the performance metrics to obtain a second set of performance data; determining if the second set of performance data is outside pre-determined boundaries; if the second set of performance data is outside the pre-determined boundaries, varying at least one size of the second set of sizes to obtain a third set of sizes; automatically simulating the ECD, at the second set of sample points, for the third set of sizes, to obtain third simulation data; calculating, in accordance with the third simulation data, a value of the performance metric to obtain a third set of performance data; determining if the third set of performance data is outside the pre-determined boundaries; and, if the third set of performance data is inside the pre-determined boundaries, storing the third set of sizes in a computer-readable medium. Once the sizes of the features of the device on the ECD have been determined, they can be used in the actual fabrication of the ECD.

The pre-determined rules can be base on any suitable approach, including the approaches listed at Table I, and described above.

Figure 11:
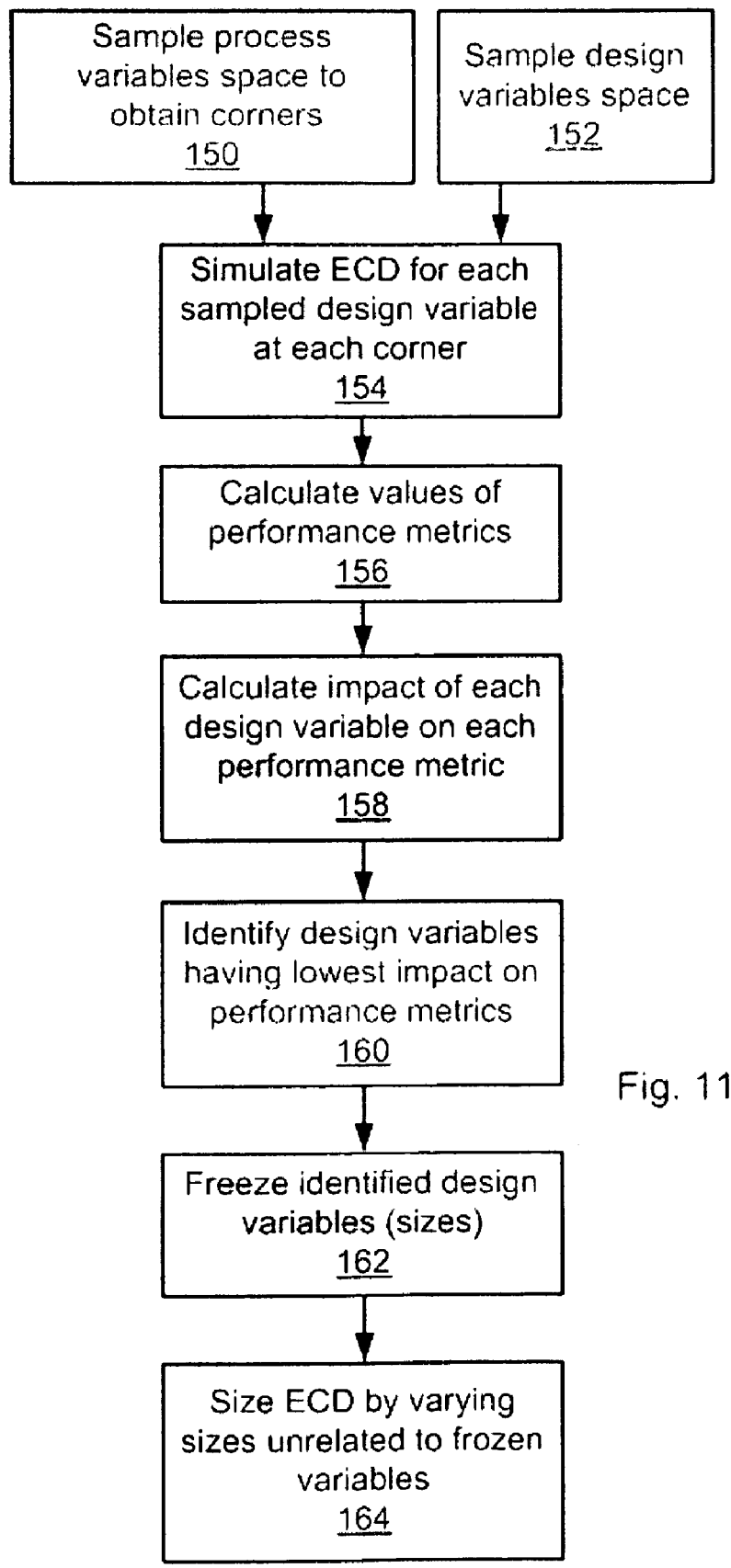
FIG. 11 shows a flowchart of a third exemplary method of the present invention.

Alternatively, as shown as FIG. 11, the process variables space can be sampled at step 150 to obtain corners (design points), and the design variables (sizes) can be sampled at step 150 to obtain candidate designs. Subsequently, at step 154, the ECD can be simulated for each candidate design, at each corner. Following this, at step 156, values of the ECD's performance metrics are determined for each combination of design variable sample and corner. At step 158, the impact of each design variable on the performance metrics is determined. At step 160, the design variables having the lowest impact on the performance metrics are identified, and, at step 162, the identified design variables are set to constant values (i.e., they are frozen). Finally, at step 164, the ECD is sized by varying design variables other that the frozen variables.

In summary, the invention can comprise:
The design flow as outlined in the summary, including all its variants
 Including manual sizing
 Including fully automated loop
 Including automated sizing
 Including mix of automated and manual sizing
 Including when the design space is pruned
 Including when the design space is not pruned
Each of the methods to prune and/or bias the design space, including:
 data-mining to get impacts from sampling
 variable-sweep in design variable space on corners=>impact extraction
 variable-sweep in design variable space on corners=>choose design hypercube
 space-filling sampling in {design, random, environmental} space=>data-mining=>impact extraction
 space-filling sampling in design space on corners+data-mining to get impact
 adaptive sampling to find bounds of feasible region (across corners)
 adaptive sampling to find mappings from design variables=>worst-case performances across corners
 more
 combinations of the above
Each of the methods to choose & prune the corners, as (random) or (random, environmental) corners
Any of the methods to prune and/or bias the design space, where the results are used as inputs to other CAD tools
Any of the methods used to choose & prune corners, where the resulting corners are used as inputs to other CAD tools In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the present invention are intended to be examples only. Alterations, modifications and variations may be effected to the particular embodi-

What is claimed is:

1. A non-transitory, tangible computer-readable medium containing instructions, which when executed by a processor cause the processor to perform a method to size an electrical circuit design (ECD), the ECD having process variables and environmental variables associated thereto, the process variables defining a process variables space, the environmental variables defining an environmental variables space, the ECD having devices, the devices having associated thereto variable dimensions, the variables dimensions having associated thereto a first set of sizes, the ECD further having associated thereto a plurality of performance metrics, the method comprising steps of:

sampling at least one of the process variables space and the environmental variables space to obtain a first set of sample points;

automatically simulating the ECD, in accordance with the first set of sizes, at the first set of sample points to obtain first simulation data;

calculating a value for each performance metric in accordance with the first simulation data to obtain a first set of performance data;

determining if a portion of the first set of performance data is outside pre-determined boundaries;

if the portion the first set of performance data is outside the pre-determined boundaries, selecting, from the first set of samples points, in accordance with the first set of performance data and in accordance with pre-determined rules, samples points to obtain a set of selected sample points;

varying at least one size of the first set of sizes to obtain a second set of sizes;

simulating the ECD, in accordance with the second set of sizes, at the set of selected sample points to obtain second simulation data;

calculating a value for each performance metric in accordance with the second simulation data to obtain a second set of performance data;

determining if the second set of performance data is inside the pre-determined boundaries; and if the second set of performance data is inside the pre-determined boundaries, storing the second set of sizes in a non-transitory computer-readable medium.

2. The non-transitory, tangible computer-readable medium of claim 1 wherein the pre-determined rules include selecting, for each performance metric, a sample point having a maximum performance value and a sample point having a minimum performance value.

3. The non-transitory, tangible computer-readable medium of claim 2 wherein the step of selecting, for each performance metric, the sample point having a maximum performance value and the sample point having a minimum performance value, includes:

modeling each performance metric as a function of the at least one of the process variables space and the environmental variables space, to obtain a model of said each performance metric; and optimizing the model of said each performance metric to obtain the sample point having a maximum performance value and the sample point having a minimum performance value.

4. The non-transitory, tangible computer-readable medium of claim 1 wherein the pre-determined rules include selecting one or more sample points through inverse non-dominated filtering of the first set of sample points.

5. The non-transitory, tangible computer-readable medium of claim 4 wherein the inverse non-dominated filtering of the first set of sample points is followed by a clustering of the sample points, the clustering being in accordance with a pre-determined performance scaling criteria.

6. The non-transitory, tangible computer-readable medium of claim 1 wherein the pre-determined rules include selecting, for each performance metric, a sample point having a worst-case performance value, the worst-case performance value being one of: (a) a maximum performance value for a performance metric to be minimized in the ECD; (b) a maximum performance value for a performance metric that is to be set equal or greater than a pre-determined threshold in the ECD; (c) a minimum performance value for a performance metric to be maximized in the ECD; and (d) a minimum performance value for a performance metric that is to be set equal or smaller than a pre-determined threshold in the ECD.

7. The non-transitory, tangible computer-readable medium of claim 6 wherein the selecting is followed by a clustering of the sample points in accordance with at least one of a pre-determined process variables space scaling criteria and a pre-determined environmental variables space scaling criteria.

8. The non-transitory, tangible computer-readable medium of claim 6 wherein the minimum performance value is outside a pre-determined feasibility range.

9. The non-transitory, tangible computer-readable medium of claim 8 wherein the selecting is followed by a clustering of the sample points in accordance with at least one of a pre-determined process variables space scaling criteria and a pre-determined environmental variables space scaling criteria.

10. The non-transitory, tangible computer-readable medium of claim 6 wherein the step of selecting, for each performance metric, the sample point having a worst-case performance value, includes:

modeling each performance metric as a function of the at least one of the process variables space and the environmental variables space, to obtain a model of said each performance metric; and optimizing the model of said each performance metric to obtain the sample point having the worst-case performance value.

11. The non-transitory, tangible computer-readable medium of claim 6 wherein the step of selecting, for each performance metric, the sample point having a worst-case performance value, includes:

modeling each performance metric as a function of the at least one of the process variables space and the environmental variables space, to obtain a model of said each performance metric;

for said each performance metric to be maximized in the ECD, optimizing the model of said each performance metric to obtain a sample point having a respective minimum performance value; and for said each performance metric to be minimized in the ECD, optimizing the model of said each performance metric to obtain the sample point having a respective maximum performance value.

12. The non-transitory, tangible computer-readable medium of claim 1 wherein:

the step of automatically simulating the ECD includes simulating the ECD at the first set of sample points, with a plurality of test harnesses, the first simulation data including simulation data for each test harness, the first set of performance data including performance data for each test harness; and the pre-determined rules include calculating, for each test harness, in accordance with its respective performance data, a yield of the ECD for each sample point; and selecting a sample point associated with a lowest yield of the ECD.

13. The non-transitory, tangible computer-readable medium of claim 1 wherein:
the step of automatically simulating the ECD includes simulating the ECD at the first set of sample points, with a plurality of test harnesses, the first simulation data including simulation data for each test harness, the first set of performance data including performance data for each test harness; and
the pre-determined rules include calculating, for each test harness, in accordance with its respective performance data, a yield of the ECD for each sample point; and selecting, for each test harness, a sample point associated with a lowest yield of the ECD.

14. The non-transitory, tangible computer-readable medium of claim 1 wherein the performance metrics include at least one of an area of the ECD, power consumption, gain and bandwidth.

15. The non-transitory, tangible computer-readable medium of claim 1 wherein the simulating the ECD includes simulating the ECD in accordance with an analog electronic circuit simulator.

16. The non-transitory, tangible computer-readable medium of claim 1 wherein the sampling includes Monte Carlo sampling from a distribution describing manufacturing variations of the process variables.

17. The non-transitory, tangible computer-readable medium of claim 1 wherein the sampling includes Latin Hypercube sampling from a distribution describing manufacturing variations of the process variables.

18. A non-transitory, tangible computer-readable medium containing instructions, which when executed by a processor cause the processor to perform a method to size an electrical circuit design (ECD), the ECD having associated thereto design variables, process variables, and environmental variables, the design variables, process variables and environmental variables respectively defining a design variables space, a process variables space and an environmental variables space, the ECD having devices, the devices having associated thereto variable dimensions, the variable dimensions being part of the design variables, the variables dimensions having associated thereto a first set of sizes, the ECD further having associated thereto performance metrics, the method comprising steps of:
sampling the process variables space to obtain a first set of sample points;
automatically simulating the ECD at the first set of sample points, in accordance with the first set of sizes, to obtain first simulation data;
calculating, in accordance with the first simulation data, for each point of the first set of sample points, a value of at least one of the performance metrics to obtain a first set of performance data;
calculating, in accordance with the first set of performance data, an impact of each process variable on the at least one of the performance metrics;
calculating, in accordance with the impact of each process variable on the at least one of the performance metrics, an impact of each device on the at least one of the performance metrics;
identifying, in accordance with the impact of each device on the at least one of the performance metrics, one or more devices each having an impact on the at least one of the performance metrics that is less than a pre-determined minimum impact, to obtain a lowest impact device set;
identifying design variables upon which the lowest impact device set depends, to obtain identified design variables, the identified design variables including at least one size of the first set of sizes;
fixing each of the identified design variables to a constant value, to have the first set of sizes include fixed sizes and variables sizes;
varying at least one variable size of the first set of sizes to obtain a second set of sizes;
selecting, from the first set of sample points, in accordance with the first set of performance data, and in accordance with pre-determined rules, a second set of sample points;
automatically simulating the ECD, at the second set of sample points, for the second set of sizes, to obtain second simulation data;
calculating, in accordance with the second simulation data, a value of each of the performance metrics to obtain a second set of performance data;
determining if the second set of performance data is outside pre-determined boundaries;
if the second set of performance data is outside the pre-determined boundaries, varying at least one size of the second set of sizes to obtain a third set of sizes;
automatically simulating the ECD, at the second set of sample points, for the third set of sizes, to obtain third simulation data;
calculating, in accordance with the third simulation data, a value of the performance metric to obtain a third set of performance data;
determining if the third set of performance data is outside the pre-determined boundaries; and
if the third set of performance data is inside the pre-determined boundaries, storing the third set of sizes in a non-transitory computer-readable medium.

19. The non-transitory, tangible computer-readable medium of claim 18 wherein the pre-determined rules include selecting, for each performance metric, a sample point having a maximum performance value and a sample point having a minimum performance value.

20. The non-transitory, tangible computer-readable medium of claim 18 wherein the step of calculating, in accordance with the first set of performance data, an impact of each process variable on at least one of the performance metrics, includes a step of analyzing an absolute correlation of each process variable on the at least one of the performance metrics.

21. The non-transitory, tangible computer-readable medium of claim 20 wherein the step of calculating, in accordance with the first set of performance data, an impact of each process variable on at least one of the performance metrics, includes a step of applying analysis of variance technique to relate process variable values to the at least one of the performance metrics.

22. The non-transitory, tangible computer-readable medium of claim 18 wherein the calculating, in accordance with the first set of performance data, an impact of each process variable on at least one of the performance metrics, includes steps of:
determining, in accordance with the performance data and with the pre-determined boundaries, a feasibility of each sample point of the first set of sample points;
forming a classifier model for the performance metrics, the classifier model mapping process variables to feasibility; and extracting, in accordance with the classifier model, a relative importance of each process variable on the feasibility.

23. The non-transitory, tangible computer-readable medium of claim 18 wherein the calculating, in accordance with the first set of performance data, an impact of each process variable on at least one of the performance metrics, includes steps of:
determining, in accordance with the performance data and with the pre-determined boundaries, a worst-case value for each performance metric of each process point;
forming a regressor model for each performance metric, the regressor models mapping the process variables to worst-case performance values; and
extracting, in accordance with the regressor models, a relative importance of each process variable on each worst case performance value.

24. The non-transitory, tangible computer-readable medium of claim 18 wherein the performance metrics include one of an area of the ECD, power consumption, gain and bandwidth.

25. The non-transitory, tangible computer-readable medium of claim 18 wherein the simulating the ECD includes simulating the ECD in accordance with an analog electronic circuit simulator.

26. The non-transitory, tangible computer-readable medium of claim 18 wherein the sampling includes Monte Carlo sampling.

27. The non-transitory, tangible computer-readable medium of claim 18 wherein the sampling includes Latin Hypercube sampling.

28. The non-transitory, tangible computer-readable medium of claim 18 wherein the calculating, in accordance with the impact of each process variable, an impact of each device on at least one of the performance metrics includes, for each device, summing the impacts of each process variable associated with the device.

29. The non-transitory, tangible computer-readable medium of claim 18 wherein the calculating, in accordance with the impact of each process variable on the at least one of the performance metrics, an impact of each device on the at least one of the performance metrics includes: identifying process variables having an impact on the at least one of the performance metrics that is greater that a pre-determined threshold; and calculating the impact of each device on the at least one of the performance metric in accordance with the impacts that are greater that the pre-determined threshold.

30. The non-transitory, tangible computer-readable medium of claim 18 wherein
the calculating, in accordance with the impact of each process variable on the at least one of the performance metrics, an impact of each device on the at least one of the performance metrics includes: ordering the process variables in accordance with their respective impact to obtain an impact order of process variables; and selecting, in accordance with the impact order of the process variables a pre-determined number of process variables; and
the identifying, in accordance with the impact of each device on the at least one of the performance metrics, the one or more devices that each has an impact on the at least one of the performance metrics that is greater than the pre-determined minimum impact, to obtain a highest impact device set, includes identifying the one or more devices in accordance with the selected pre-determined number of process variables.

31. The non-transitory, tangible computer-readable medium of claim 18 wherein the calculating, in accordance with the impact of each process variable on the at least one of the performance metrics, an impact of each device on the at least one of the performance metrics, includes steps of:
calculating a total impact of all process variables as a summation of each process variable impact;
ordering the process variables from a highest-impact to a lowest-impact;
selecting a subset of process variables by choosing highest-impact process variables having a sum impact that is substantially equal to a pre-determined percentage of the total impact; and
calculating the impact of each device on the at least one of the performance metrics, in accordance with the impact of each process variable of the subset of process variables.

32. The non-transitory, tangible computer-readable medium of claim 18 wherein the identifying design variables upon which the lowest impact device set depends, includes steps of:
displaying at least one of the design variables and devices, and their respective impacts to a user; and
the user identifying the design variables related to the highest impact device set.

33. The non-transitory, tangible computer-readable medium of claim 18 wherein the fixing each of the identified design variables to a constant value, to have the first set of sizes include fixed sizes and variables sizes, includes setting each identified design variable to a corresponding value of the first set of sizes.

34. A non-transitory, tangible computer-readable medium containing instructions, which when executed by a processor cause the processor to perform a method to size an electrical circuit design (ECD), the ECD having associated thereto design variables, process variables, and environmental variables, the design variables, process variables and environmental variables respectively defining a design variables space, a process variables space and an environmental variables space, the ECD having associated thereto a set of design corners representing a sample of the process variables space, the ECD having devices, the devices having associated thereto variable sizes, the variable sizes being part of the design variables, the ECD further having associated thereto performance metrics, the method comprising steps of:
sampling the design variables space to obtain a first set of candidate designs; automatically simulating each candidate design at each design corner, to obtain first simulation data;
calculating, in accordance with the first simulation data, for each candidate design, a value of at least one of the performance metrics to obtain a first set of performance data;
calculating, in accordance with the first set of candidate designs and the first set of performance data, an impact of each design variable on the at least one of the performance metrics, to obtain impact data;
identifying, in accordance with the impact data, one or more design variables, to obtain identified design variables, each identified design variable having an impact on the at least one of the performance metrics that is less than a pre-determined maximum impact;
reducing the design variables space by fixing each of the identified design variables to a constant value, to obtain a reduced design variables space;

assigning, for each design variable of the reduced design variables space, a first size value to obtain a first set of sizes;

automatically simulating the ECD, in accordance with the set of design corners, for the first set of sizes, to obtain second simulation data;

calculating, in accordance with the second simulation data, a value of the at least one performance metric to obtain a second set of performance data;

determining if the second set of performance data is outside pre-determined boundaries;

if the second set of performance data is outside the pre-determined boundaries, varying at least one size of the first set of sizes to obtain a second set of sizes;

automatically simulating the ECD, in accordance with the set of design corners, at the second set of sizes, to obtain third simulation data;

calculating, in accordance with the third simulation data, a value of the at least one performance metric to obtain a third set of performance data; and determining if the third set of performance data is outside the pre-determined boundaries; and if the third set of performance data is inside the pre-determined boundaries, storing the second set sizes in a non-transitory computer-readable medium.

35. The non-transitory, tangible computer-readable medium of claim 34 wherein the pre-determined rules include selecting, for each performance metric, a sample point having a maximum performance value and a sample point having a minimum performance value.

36. The non-transitory, tangible computer-readable medium of claim 34 wherein the step of calculating, in accordance with the first set of candidate designs and with the first set of performance data, an impact of each design variable on at least one of the performance metrics, includes a step of analyzing an absolute correlation of each design variable on the at least one of the performance metrics.

37. The non-transitory, tangible computer-readable medium of claim 36 wherein the step of calculating, in accordance with the first set of candidate designs and with the first set of performance data, an impact of each design variable on at least one of the performance metrics, includes a step of applying analysis of variance technique to relate process variable values to the at least one of the performance metrics.

38. The non-transitory, tangible computer-readable medium of claim 34 wherein the calculating, in accordance with the first set of candidate designs and with the first set of performance data, an impact of each design variable on at least one of the performance metrics, includes steps of:

determining, in accordance with the performance data and with the pre-determined boundaries, a feasibility of each sample point of the first set of sample points;

forming a classifier model for the performance metrics, the classifier model mapping design variables to feasibility; and extracting, in accordance with the classifier model, a relative importance of each design variable on the feasibility.

39. The non-transitory, tangible computer-readable medium of claim 34 wherein the calculating, in accordance with the first set of candidate designs and with the first set of performance data, an impact of each design variable on at least one of the performance metrics, includes steps of:

determining, in accordance with the performance data and with the pre-determined boundaries, a worst-case value for each performance metric of each candidate design;

forming a regressor model for each performance metric, the regressor models mapping the design variables to worst-case performance values; and extracting, in accordance with the regressor models, a relative importance of each design variable on each worst case performance value.

40. The non-transitory, tangible computer-readable medium of claim 34 wherein the performance metrics include one of an area of the ECD, power consumption, gain and bandwidth.

41. The non-transitory, tangible computer-readable medium of claim 34 wherein the simulating the ECD includes simulating the ECD in accordance with an analog electronic circuit simulator.

42. The non-transitory, tangible computer-readable medium of claim 34 wherein the sampling the design variables space includes Monte Carlo sampling across uniform distributions of each design variable, each uniform distribution bounded by respective maximum and minimum values of each design variables.

43. The non-transitory, tangible computer-readable medium of claim 34 wherein the sampling the design variables space includes Latin Hypercube sampling across uniform distributions, each uniform distribution bounded by respective maximum and minimum values of each design variables.

44. The non-transitory, tangible computer-readable medium of claim 34 wherein the identifying, in accordance with the impact data, one or more design variables, includes steps of:

ordering the design variables from highest-impact to lowest-impact; and keeping only a pre-determined number of lowest-impact design variables.

45. The non-transitory, tangible computer-readable medium of claim 34 wherein the identifying, in accordance with the impact data, one or more design variables, includes steps of:

calculating a total impact of all design variables as a summation of each variable's impact;

ordering the design variables from highest-impact to lowest-impact; selecting a subset of design variables by choosing lowest-impact process variables having a sum impact that is substantially equal to a pre-determined percentage of the total impact;

calculating the impact of each design variable on the at least one of the performance metrics, in accordance with the impact of each design variable of the subset of process variables; and identifying, in accordance with the impact data, one or more design variables, to obtain identified design variables, each identified design variable having an impact on the at least one of the performance metrics that is less than a pre-determined maximum impact.

46. The non-transitory, tangible computer-readable medium of claim 34 wherein the identifying, in accordance with the impact data, one or more design variables, to obtain identified design variables, includes steps of:

displaying at least one of the design variables and its respective impact to a user; and the user identifying the design variables related to the lowest impact.

47. A non-transitory, tangible computer-readable medium containing instructions, which when executed by a processor cause the processor to perform, in a sizing procedure of electrical circuit design (ECD), the ECD having associated thereto design variables, process variables, and environmental variables, the design variables, process variables and environmental variables respectively defining a design variables space, a process variables space and an environmental variables space, the ECD having devices, the devices having associated thereto variable dimensions, the variable dimensions being part of the design variables, the variables dimensions having associated thereto a first set of sizes, the ECD further having associated thereto performance metrics, a method to reduce a number of the variables dimensions to size, the method comprising steps of:

sampling the process variables space to obtain a first set of sample points; automatically simulating the ECD at the first set of sample points, in accordance with the first set of sizes, to obtain first simulation data;
  calculating, in accordance with the first simulation data, a value of each performance metric to obtain a first set of performance data;
  calculating, in accordance with the first set of performance data, an impact of each process variable on at least one of the performance metrics;
  calculating, in accordance with the impact of each process variable on the at least one of the performance metrics, an impact of each device on the at least one of the performance metrics;
  identifying, in accordance with the impact of each device on the at least one of the performance metrics, one or more devices each having an impact on the at least one of the performance metrics that is greater than a pre-determined minimum impact, to obtain a highest impact device set;
  identifying design variables unrelated to the highest impact device set, to obtain identified design variables, the identified design variables including at least one size of the first set of sizes; and
  fixing each of the identified design variables to a constant value, to have the first set of sizes include fixed sizes and variables sizes.

48. A non-transitory, tangible computer-readable medium containing instructions, which when executed by a processor cause the processor to perform, in a sizing procedure of electrical circuit design (ECD), the ECD having associated thereto design variables, process variables, and environmental variables, the design variables, process variables and environmental variables respectively defining a design variables space, a process variables space and an environmental variables space, the ECD having associated thereto a set of design corners representing a sample of the process variables space, the ECD having devices, the devices having associated thereto variable sizes, the variable sizes being part of the design variables, the ECD further having associated thereto performance metrics, a method to reduce a number of the variables dimensions to size, the method comprising steps of the method comprising steps of:

sampling the design variables space to obtain a first set of candidate designs; automatically simulating each candidate design at each design corner, to obtain first simulation data;
  calculating, in accordance with the first simulation data, for each candidate design, a value of at least one of the performance metrics to obtain a first set of performance data;
  calculating, in accordance with the first set of candidate designs and the first set of performance data, an impact of each design variable on the at least one of the performance metrics, to obtain impact data;
  identifying, in accordance with the impact data, one or more design variables, to obtain identified design variables, each identified design variable having an impact on the at least one of the performance metrics that is less than a pre-determined maximum impact;
  reducing the design variables space by fixing each of the identified design variables to a constant value, to obtain a reduced design variables space; and
  if the second set of performance data is inside the pre-determined boundaries, storing the second set sizes in a non-transitory computer-readable medium.

49. A method to size an electrical circuit design (ECD), the ECD having process variables and environmental variables associated thereto, the process variables defining a process variables space, the environmental variables defining an environmental variables space, the ECD having devices, the devices having associated thereto variable dimensions, the variables dimensions having associated thereto a first set of sizes, the ECD further having associated thereto a plurality of performance metrics, the method comprising steps of:

sampling at least one of the process variables space and the environmental variables space to obtain a first set of sample points;
  automatically simulating the ECD, in accordance with the first set of sizes, at the first set of sample points to obtain first simulation data;
  calculating a value for each performance metric in accordance with the first simulation data to obtain a first set of performance data;
  determining if a portion of the first set of performance data is outside pre-determined boundaries;
  if a portion the first set of performance data is outside the pre-determined boundaries, selecting, from the first set of sample points, in accordance with the first set of performance data and in accordance with pre-determined rules, samples points to obtain a set of selected sample points;
  outputting the set of selected sample points to a computer aided design (CAD) module; and
  at the CAD module, in accordance with the set of selected sample points, adjusting the variable dimensions of the devices of the ECD.

50. A system to size an electrical circuit design (ECD), the ECD having process variables and environmental variables associated thereto, the process variables defining a process variables space, the environmental variables defining an environmental variables space, the ECD having devices, the devices having associated thereto variable dimensions, the variables dimensions having associated thereto a first set of sizes, the ECD further having associated thereto a plurality of performance metrics, the system comprising:

a database to store the process variables and environmental variables;
  a sampler in communication with the database, the sampler to sample the process variables space to obtain a first set of sample points;
  an ECD simulator in communication with the sampler, the ECD simulator to automatically simulate the ECD, in accordance with the first set of sizes, at the first set of sample points to obtain first simulation data, the ECD simulator to calculate, for each of the sample points a value of at least one of the performance metrics in accordance with the first simulation data to obtain a first set of performance data;
  a design point selection module (DPSM) in communication with the sampler and the ECD simulator, the DPSM to determine if a portion of the first set of performance data is outside pre-determined boundaries, the DPSM to select, if a portion the first set of performance data is outside the pre-determined boundaries, from the first set of samples points, in accordance with the first set of performance data and in accordance with pre-determined rules, samples points to obtain a set of selected sample points;

a display module in communication with the DPSM, the display module to display to a user at least one of the set of selected sample points, the pre-determined rules, and the value for each performance metric;

a user input module in communication with at least the DPSM, the user input module to input changes to at least one of the set of selected sample points, the pre-determined rules, and the value for each performance metric; and a sizing module in communication with the DPSM, the sizing module to vary at least one size of the first set of sizes, in accordance with changes input by the user, to obtain a second set of sizes, the ECD simulator to simulate, in accordance with the second set of sizes, at the set of selected sample points to obtain second simulation data, the DPSM to calculate a value for each performance metric in accordance with the second simulation data to obtain a second set of performance data, the DPSM to determine if the second set of performance data is outside pre-determined boundaries.

51. A non-transitory, tangible computer-readable medium having recorded thereon statements and instructions for execution by a computer to carry out a method to size an electrical circuit design (ECD), the ECD having process variables and environmental variables associated thereto, the process variables defining a process variables space, the environmental variables defining an environmental variables space, the ECD having devices, the devices having associated thereto variable dimensions, the variables dimensions having associated thereto a first set of sizes, the ECD further having associated thereto a plurality of performance metrics, the method comprising steps of:

sampling at least one of the process variables space and the environmental variables space to obtain a first set of sample points;

automatically simulating the ECD, in accordance with the first set of sizes, at the first set of sample points to obtain first simulation data;

calculating a value for each performance metric in accordance with the first simulation data to obtain a first set of performance data;

determining if a portion of the first set of performance data is outside pre-determined boundaries;

if a portion the first set of performance data is outside the pre-determined boundaries, selecting, from the first set of samples points, in accordance with the first set of performance data and in accordance with pre-determined rules, samples points to obtain a set of selected sample points;

varying at least one size of the first set of sizes to obtain a second set of sizes;

simulating the ECD, in accordance with the second set of sizes, at the set of selected sample points to obtain second simulation data;

calculating a value for each performance metric in accordance with the second simulation data to obtain a second set of performance data;

determining if the second set of performance data is inside the pre-determined boundaries; and if the second set of performance data is inside the pre-determined boundaries, storing the second set sizes a memory.

52. A non-transitory, tangible computer-readable medium having recorded thereon statements and instructions for execution by a computer to carry out a method to size an electrical circuit design (ECD), the ECD having associated thereto design variables, process variables, and environmental variables, the design variables, process variables and environmental variables respectively defining a design variables space, a process variables space and an environmental variables space, the ECD having devices, the devices having associated thereto variable dimensions, the variable dimensions being part of the design variables, the variables dimensions having associated thereto a first set of sizes, the ECD further having associated thereto performance metrics, the method comprising steps of:

sampling the process variables space to obtain a first set of sample points;

automatically simulating the ECD at the first set of sample points, in accordance with the first set of sizes, to obtain first simulation data;

calculating, in accordance with the first simulation data, for each of the sample points, a value of at least one of the performance metrics to obtain a first set of performance data; calculating, in accordance with the first set of performance data, an impact of each process variable on the at least one of the performance metrics;

calculating, in accordance with the impact of each process variable on the at least one of the performance metrics, an impact of each device on the at least one of the performance metrics;

identifying, in accordance with the impact of each device on the at least one of the performance metrics, one or more devices each having an impact on the at least one of the performance metrics that is less than a pre-determined minimum impact, to obtain a lowest impact device set;

identifying design variables upon which the lowest impact device set depends, to obtain identified design variables, the identified design variables including at least one size of the first set of sizes;

fixing each of the identified design variables to a constant value, to have the first set of sizes include fixed sizes and variables sizes;

varying at least one variable size of the first set of sizes to obtain a second set of sizes;

selecting, from the first set of sample points, in accordance with the first set of performance data, and in accordance with pre-determined rules, a second set of sample points;

automatically simulating the ECD, at the second set of sample points, for the second set of sizes, to obtain second simulation data;

calculating, in accordance with the second simulation data, a value of each of the performance metrics to obtain a second set of performance data;

determining if the second set of performance data is outside pre-determined boundaries;

if the second set of performance data is outside the pre-determined boundaries, varying at least one size of the second set of sizes to obtain a third set of sizes;

automatically simulating the ECD, at the second set of sample points, for the third set of sizes, to obtain third simulation data;

calculating, in accordance with the third simulation data, a value of the performance metric to obtain a third set of performance data;

determining if the third set of performance data is outside the pre-determined boundaries; and if the third set of performance data is inside the pre-determined boundaries, storing the third set sizes in a memory.

53. A non-transitory, tangible computer-readable medium having recorded thereon statements and instructions for execution by a computer to carry out a method to size an electrical circuit design (ECD), the ECD having associated thereto design variables, process variables, and environmental variables, the design variables, process variables and environmental variables respectively defining a design variables space, a process variables space and an environmental variables space, the ECD having associated thereto a set of design corners representing a sample of the process variables space, the ECD having devices, the devices having associated thereto variable sizes, the variable sizes being part of the design variables, the ECD further having associated thereto performance metrics, the method comprising steps of:

sampling the design variables space to obtain a first set of candidate designs; automatically simulating each candidate design at each design corner, to obtain first simulation data;

calculating, in accordance with the first simulation data, for each candidate design, a value of at least one of the performance metrics to obtain a first set of performance data;

calculating, in accordance with the first set of candidate designs and the first set of performance data, an impact of each design variable on the at least one of the performance metrics, to obtain impact data;

identifying, in accordance with the impact data, one or more design variables, to obtain identified design variables, each identified design variable having an impact on the at least one of the performance metrics that is less than a pre-determined maximum impact;

reducing the design variables space by fixing each of the identified design variables to a constant value, to obtain a reduced design variables space;

assigning, for each design variable of the reduced design variables space, a first size value to obtain a first set of sizes;

automatically simulating the ECD, in accordance with the set of design corners, for the first set of sizes, to obtain second simulation data;

calculating, in accordance with the second simulation data, a value of the at least one performance metric to obtain a second set of performance data;

determining if the second set of performance data is outside pre-determined boundaries;

if the second set of performance data is outside the pre-determined boundaries, varying at least one size of the first set of sizes to obtain a second set of sizes;

automatically simulating the ECD, in accordance with the set of design corners, at the second set of sizes, to obtain third simulation data;

calculating, in accordance with the third simulation data, a value of the at least one performance metric to obtain a third set of performance data; and determining if the third set of performance data is outside the pre-determined boundaries; and if the third set of performance data is inside the pre-determined boundaries, storing the second set sizes in a memory.

54. A non-transitory, tangible computer-readable medium having recorded thereon statements and instructions for execution by a computer to carry out a method to size an electrical circuit design (ECD), the ECD having process variables and environmental variables associated thereto, the process variables defining a process variables space, the environmental variables defining an environmental variables space, the ECD having devices, the devices having associated thereto variable dimensions, the variables dimensions having associated thereto a first set of sizes, the ECD further having associated thereto a plurality of performance metrics, the method comprising steps of:

sampling at least one of the process variables space and the environmental variables space to obtain a first set of sample points;

automatically simulating the ECD, in accordance with the first set of sizes, at the first set of sample points to obtain first simulation data;

calculating a value for each performance metric in accordance with the first simulation data to obtain a first set of performance data;

determining if a portion of the first set of performance data is outside pre-determined boundaries;

if a portion the first set of performance data is outside the pre-determined boundaries, selecting, from the first set of samples points, in accordance with the first set of performance data and in accordance with pre-determined rules, samples points to obtain a set of selected sample points; and outputting the set of selected sample points to a computer aided design (CAD) module for the CAD module to adjust the variable dimensions of the devices.

* * * * *